US009536531B2

(12) United States Patent
Morrell et al.

(10) Patent No.: US 9,536,531 B2
(45) Date of Patent: Jan. 3, 2017

(54) EDITING OF HIGHER-ORDER AMBISONIC AUDIO DATA

(71) Applicant: QUALCOMM Incorporated, San Diego, CA (US)

(72) Inventors: Martin James Morrell, San Diego, CA (US); Pei Xiang, San Diego, CA (US); Richard Paul Walters, Dana Point, CA (US); Nils Günther Peters, San Diego, CA (US); Dipanjan Sen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/670,029

(22) Filed: Mar. 26, 2015

(65) Prior Publication Data

US 2016/0035356 A1   Feb. 4, 2016

Related U.S. Application Data

(60) Provisional application No. 62/032,477, filed on Aug. 1, 2014.

(51) Int. Cl.
*G10L 19/00* (2013.01)
*G10L 19/12* (2013.01)
*G10L 15/04* (2013.01)
*G10L 19/008* (2013.01)
*G06F 3/0484* (2013.01)
*G11B 27/031* (2006.01)

(52) U.S. Cl.
CPC ......... *G10L 19/008* (2013.01); *G06F 3/04842* (2013.01); *G11B 27/031* (2013.01)

(58) Field of Classification Search
None
See application file for complete search history.

(56) References Cited

U.S. PATENT DOCUMENTS

| | | | | |
|---|---|---|---|---|
| 9,078,076 | B2* | 7/2015 | Furse | H04S 3/00 |
| 9,190,065 | B2* | 11/2015 | Sen | G10L 19/008 |
| 2012/0093344 | A1* | 4/2012 | Sun | H04R 3/005 |
| | | | | 381/122 |
| 2013/0148812 | A1* | 6/2013 | Corteel | H04S 7/30 |
| | | | | 381/17 |
| 2013/0216070 | A1* | 8/2013 | Keiler | G10L 19/008 |
| | | | | 381/300 |
| 2014/0086416 | A1* | 3/2014 | Sen | G10L 19/008 |
| | | | | 381/23 |

(Continued)

OTHER PUBLICATIONS

"Call for Proposals for 3D Audio," ISO/IEC JTC1/SC29/WG11/N13411, Jan. 2013, 20 pp.

(Continued)

*Primary Examiner* — Satwant Singh
(74) *Attorney, Agent, or Firm* — Shumaker & Sieffert, P.A.

(57) ABSTRACT

In general, techniques are described for editing of higher-order ambisonic audio data. A device comprising a memory and one or more processors may be configured to perform the techniques. The memory may be configured to store spherical harmonic (SH) basis functions. The one or more processors may be configured to manipulate the SH basis functions associated with higher order ambisonics coefficients to alter a direction of an audio object represented by the higher order ambisonics coefficients.

20 Claims, 20 Drawing Sheets

(56) References Cited

U.S. PATENT DOCUMENTS

| | | | |
|---|---|---|---|
| 2014/0355769 A1* | 12/2014 | Peters | H04R 5/00 381/23 |
| 2014/0355770 A1* | 12/2014 | Peters | H04R 5/00 381/23 |
| 2014/0355771 A1* | 12/2014 | Peters | H04R 5/00 381/23 |
| 2014/0358266 A1* | 12/2014 | Peters | H04R 5/00 700/94 |
| 2014/0358558 A1* | 12/2014 | Sen | H04R 5/00 704/500 |
| 2014/0358559 A1* | 12/2014 | Sen | H04R 5/00 704/500 |
| 2014/0358560 A1* | 12/2014 | Sen | H04R 5/00 704/500 |
| 2014/0358561 A1* | 12/2014 | Sen | H04R 5/00 704/500 |
| 2014/0358562 A1* | 12/2014 | Sen | H04R 5/00 704/500 |
| 2014/0358563 A1* | 12/2014 | Sen | H04R 5/00 704/500 |
| 2014/0358564 A1* | 12/2014 | Sen | H04R 5/00 704/500 |
| 2014/0358565 A1* | 12/2014 | Peters | H04R 5/00 704/500 |
| 2015/0127354 A1* | 5/2015 | Peters | G10L 19/008 704/500 |
| 2015/0154971 A1 | 6/2015 | Boehm et al. | |
| 2015/0163615 A1 | 6/2015 | Boehm et al. | |
| 2015/0213802 A1* | 7/2015 | Bae | G10L 21/00 704/251 |
| 2015/0213803 A1* | 7/2015 | Peters | G10L 19/002 704/500 |
| 2015/0213805 A1* | 7/2015 | Peters | G10L 19/002 704/500 |
| 2015/0213809 A1* | 7/2015 | Peters | G10L 19/002 704/500 |
| 2015/0262586 A1* | 9/2015 | Furse | H04S 3/00 381/303 |
| 2015/0271621 A1* | 9/2015 | Sen | H04S 7/30 381/303 |
| 2015/0332690 A1* | 11/2015 | Kim | G10L 19/008 704/222 |
| 2015/0332691 A1* | 11/2015 | Kim | G10L 19/038 704/222 |
| 2015/0332692 A1* | 11/2015 | Kim | G10L 19/008 704/222 |
| 2016/0035358 A1* | 2/2016 | Sen | G10L 19/008 381/23 |
| 2016/0088415 A1 | 3/2016 | Krueger et al. | |
| 2016/0104493 A1* | 4/2016 | Kim | G10L 19/008 381/22 |
| 2016/0104494 A1* | 4/2016 | Kim | G10L 19/008 381/22 |
| 2016/0104495 A1* | 4/2016 | Peters | G10L 19/008 381/22 |

OTHER PUBLICATIONS

Poletti, "Three-Dimensional Surround Sound Systems Based on Spherical Harmonics," J. Audio Eng. Soc., vol. 53, No. 11, Nov. 2005, pp. 1004-1025.

U.S. Appl. No. 14/670,074, filed Mar. 26, 2015, by Martin James Morrell.

U.S. Appl. No. 14/630,165, filed Feb. 24, 2015, by Martin James Morrell.

Herre, et al., "MPEG-H 3D Audio—The New Standard for Coding of Immersive Spatial Audio," IEEE Journal of Selected Topics in Signal Processing, vol. 9, No. 5, Aug. 2015, pp. 770-779.

"Information technology—High efficiency coding and media delivery in heterogeneous environments—Part 3: Part 3: 3D Audio, Amendment 3: MPEG-H 3D Audio Phase 2," ISO/IEC JTC 1/SC 29 N, Jul. 25, 2015, 208 pp.

"Information technology—High efficiency coding and media delivery in heterogeneous environments—Part 3: 3D Audio," ISO/IEC JTC 1/SC 29 N, Apr. 4, 2014, 337 pp.

"Information technology—High efficiency coding and media delivery in heterogeneous environments—Part 3: 3D Audio," ISO/IEC JTC 1/SC 29, Jul. 25, 2014, 311 pp.

Kronlachner, "Spatial Transformations for the Alteration of Ambisonic Recordings", Jun. 2014, Graz University of Technology, 73 pp.

* cited by examiner

HOA Source Tail

EDITING OF HIGHER-ORDER AMBISONIC AUDIO DATA

This application claims the benefit of U.S. Provisional Application No. 62/032,477, filed Aug. 1, 2014, entitled "EFFICIENT SOURCE TAIL FEATURE FOR AN AUDIO SOURCE TRANSFORMED TO THE SPHERICAL HARMONICS DOMAIN BY MEANS OF A SH-BASED DELAY LINE," which is hereby incorporated by reference as if set forth in their entirety herein.

TECHNICAL FIELD

This disclosure relates to audio data and, more specifically, editing of higher-order ambisonic audio data.

BACKGROUND

A higher-order ambisonics (HOA) signal (often represented by a plurality of spherical harmonic coefficients (SHC) or other hierarchical elements) is a three-dimensional representation of a soundfield. The HOA or SHC representation may represent the soundfield in a manner that is independent of the local speaker geometry used to playback a multi-channel audio signal rendered from the SHC signal. The SHC signal may also facilitate backwards compatibility as the SHC signal may be rendered to well-known and highly adopted multi-channel formats, such as a 5.1 audio channel format or a 7.1 audio channel format. The SHC representation may therefore enable a better representation of a soundfield that also accommodates backward compatibility.

SUMMARY

In general, techniques are described for editing of higher-order ambisonics audio data. More specifically, techniques are described for providing audio plug-in technologies for audio editing devices. Various aspects of this disclosure are directed to a shared memory space to enable conversion of various spatial configurations of audio data into the higher order ambisonics (HOA) domain. In turn, the HOA representation of the audio data may be converted to comport to any of various available speaker layouts, at output.

Certain aspects of this disclosure are directed to resource-efficient techniques that for alter directional information (describing a direction) for audio data, by manipulating audio data in the HOA domain. Examples of directional changes described herein include manipulation by rotation, swapping, or multiplication by a constant value. In the case of rotation of multiplication of a constant, the techniques may not be limited to objects at 0, +/−90, 180, or +/−270 degree positions. Additionally, aspects of this disclosure are directed to implementing a delay (also referred to herein as a "delay line" or "tail") to audio data. For instance, the techniques may enable audio coding devices to implement the delay by holding previous audio data.

In one aspect, a method of editing audio data comprises manipulating spherical harmonics (SH) basis functions associated with higher order ambisonics coefficients to alter a direction of an audio object represented by the higher order ambisonics coefficients.

In another aspect, a device configured to edit audio data comprises a memory configured to store spherical harmonic (SH) basis functions, and one or more processors configured to manipulate the SH basis functions associated with higher order ambisonics coefficients to alter a direction of an audio object represented by the higher order ambisonics coefficients.

In another aspect, a device configured to edit audio data comprises means for storing spherical harmonic (SH) basis functions, and means for manipulating the SH basis functions associated with higher order ambisonics coefficients to alter a direction of an audio object represented by the higher order ambisonics coefficients.

In another aspect, a non-transitory computer-readable storage medium has stored thereon instructions that, when executed, cause one or more processors to store spherical harmonic (SH) basis functions, and manipulate the SH basis functions associated with higher order ambisonics coefficients to alter a direction of an audio object represented by the higher order ambisonics coefficients.

In another aspect, a method of editing audio data comprises applying a delay to audio objects represented by one or more higher order ambisonics (HOA) coefficients by storing the audio objects represented by the one or more higher order ambisonics coefficients to a delay buffer.

In another aspect, a device configured to edit an audio object comprises a memory configured to store a higher order ambisonic (HOA) representation of the audio object, and one or more processors configured to add a source tail to the HOA representation of the audio object by storing one or more spherical harmonic (SH) basis functions associated with the audio object to a buffer.

In another aspect, a device configured to edit audio data comprises means for applying a delay to an audio object represented by one or more higher order ambisonics (HOA) coefficients based on a correlation with a user input.

In another aspect, a non-transitory computer-readable storage medium has stored thereon instructions that, when executed, cause one or more processors to apply a delay to an audio object represented by one or more higher order ambisonics (HOA) coefficients based on a correlation with a user input.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
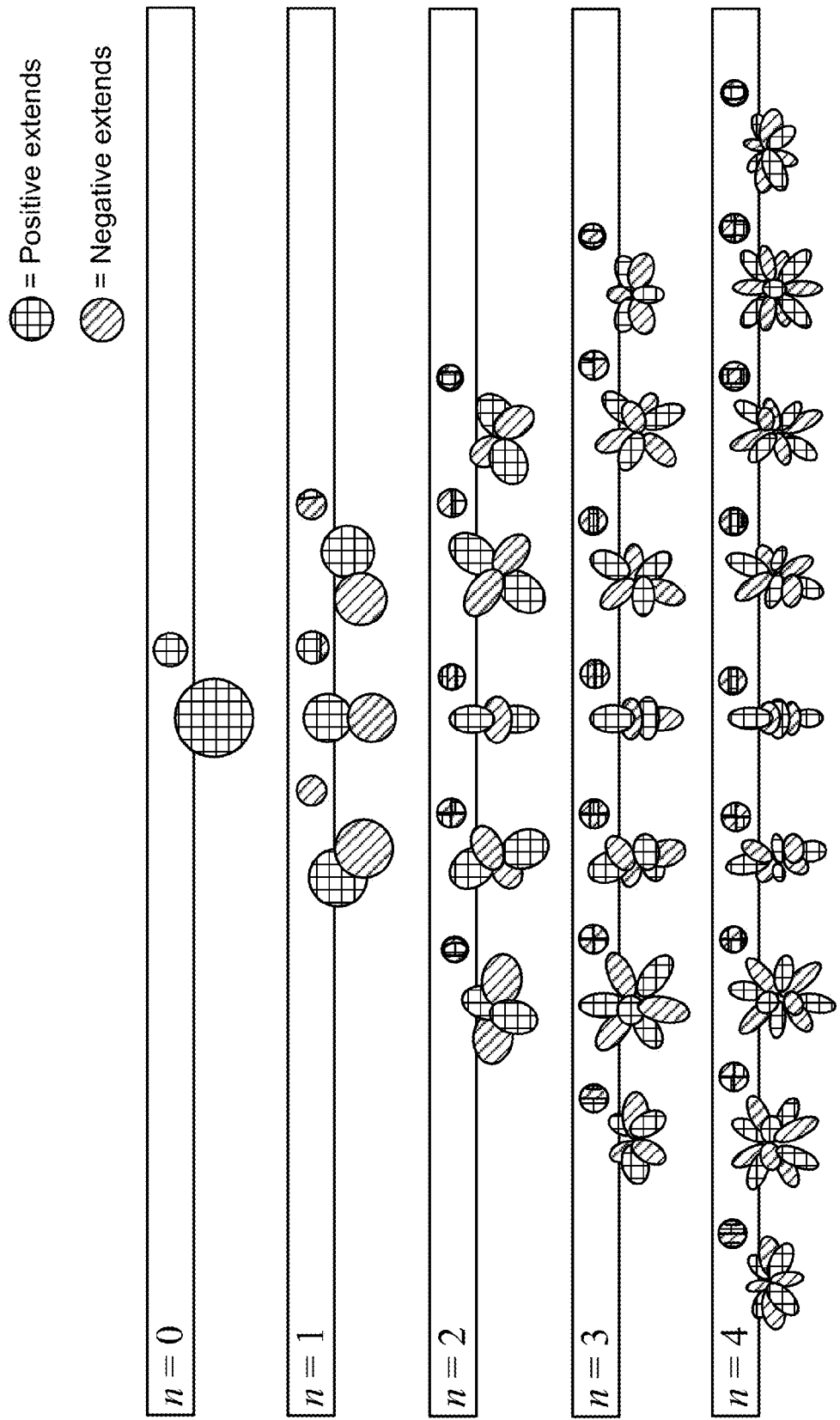
FIG. 1 is a diagram illustrating spherical harmonic basis functions of various orders and sub-orders.

The evolution of surround sound has made available many output formats for entertainment. Examples of such consumer surround sound formats are mostly 'channel' based in that they implicitly specify feeds to loudspeakers in certain geometrical coordinates. The consumer surround sound formats include the popular 5.1 format (which includes the following six channels: front left (FL), front right (FR), center or front center, back left or surround left, back right or surround right, and low frequency effects (LFE)), the growing 7.1 format, various formats that includes height speakers such as the 7.1.4 format and the 22.2 format (e.g., for use with the Ultra High Definition Television standard). Non-consumer formats can span any number of speakers (in symmetric and non-symmetric geometries) often termed 'surround arrays'. One example of such an array includes 32 loudspeakers positioned on coordinates on the corners of a truncated icosahedron.

The input to a future MPEG encoder is optionally one of three possible formats: (i) traditional channel-based audio (as discussed above), which is meant to be played through loudspeakers at pre-specified positions; (ii) object-based audio, which involves discrete pulse-code-modulation (PCM) data for single audio objects with associated metadata containing their location coordinates (amongst other information); and (iii) scene-based audio, which involves representing the soundfield using coefficients of spherical harmonic basis functions (also called "spherical harmonic coefficients" or SHC, "Higher-order Ambisonics" or HOA, and "HOA coefficients"). The future MPEG encoder may be described in more detail in a document entitled "Call for Proposals for 3D Audio," by the International Organization for Standardization/International Electrotechnical Commission (ISO)/(IEC) JTC1/SC29/WG11/N13411, released January 2013 in Geneva, Switzerland, and available at http://mpeg.chiariglione.org/sites/default/files/files/standards/parts/docs/w13411.zip.

There are various 'surround-sound' channel-based formats in the market. They range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce the soundtrack for a movie once, and not spend effort to remix it for each speaker configuration. Recently, Standards Developing Organizations have been considering ways in which to provide an encoding into a standardized bitstream and a subsequent decoding that is adaptable and agnostic to the speaker geometry (and number) and acoustic conditions at the location of the playback (involving a renderer).

To provide such flexibility for content creators, a hierarchical set of elements may be used to represent a soundfield. The hierarchical set of elements may refer to a set of elements in which the elements are ordered such that a basic set of lower-ordered elements provides a full representation of the modeled soundfield. As the set is extended to include higher-order elements, the representation becomes more detailed, increasing resolution.

One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $k=\omega/c$, c is the speed of sound (~343 m/s), $\{r_r, \theta_r, \varphi_r\}$ is a point of reference (or observation point), $j_n(\bullet)$ is the spherical Bessel function of order n, and $Y_n^m(\theta_r, \varphi_r)$ are the spherical harmonic basis functions of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

FIG. 1 is a diagram illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes.

The SHC $A_n^m(k)$ can either be physically acquired (e.g., recorded) by various microphone array configurations or, alternatively, they can be derived from channel-based or object-based descriptions of the soundfield. The SHC represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the soundfield corresponding to an individual audio object may be expressed as:

$$A_n^m(k)=g(\omega)=g(\omega)(-4\pi i k)h_n^{(2)}(kr_s)Y_n^{m*}(\theta_s,\phi_s),$$

where i is $\sqrt{-1}$, $h_n^{(2)}(\cdot)$ is the spherical Hankel function (of the second kind) of order n, and $\{r_s, \theta_s, \phi_s\}$ is the location of the object. Knowing the object source energy $g(\omega)$ as a function of frequency (e.g., using time-frequency analysis techniques, such as performing a fast Fourier transform on the PCM stream) allows us to convert each PCM object and the corresponding location into the SHC $A_n^m(k)$. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, the coefficients contain information about the soundfield (the pressure as a function of 3D coordinates), and the above represents the transformation from individual objects to a representation of the overall soundfield, in the vicinity of the observation point $\{r_r, \theta_r, \phi_r\}$. The remaining figures are described below in the context of object-based and SHC-based audio coding.

Figure 2:
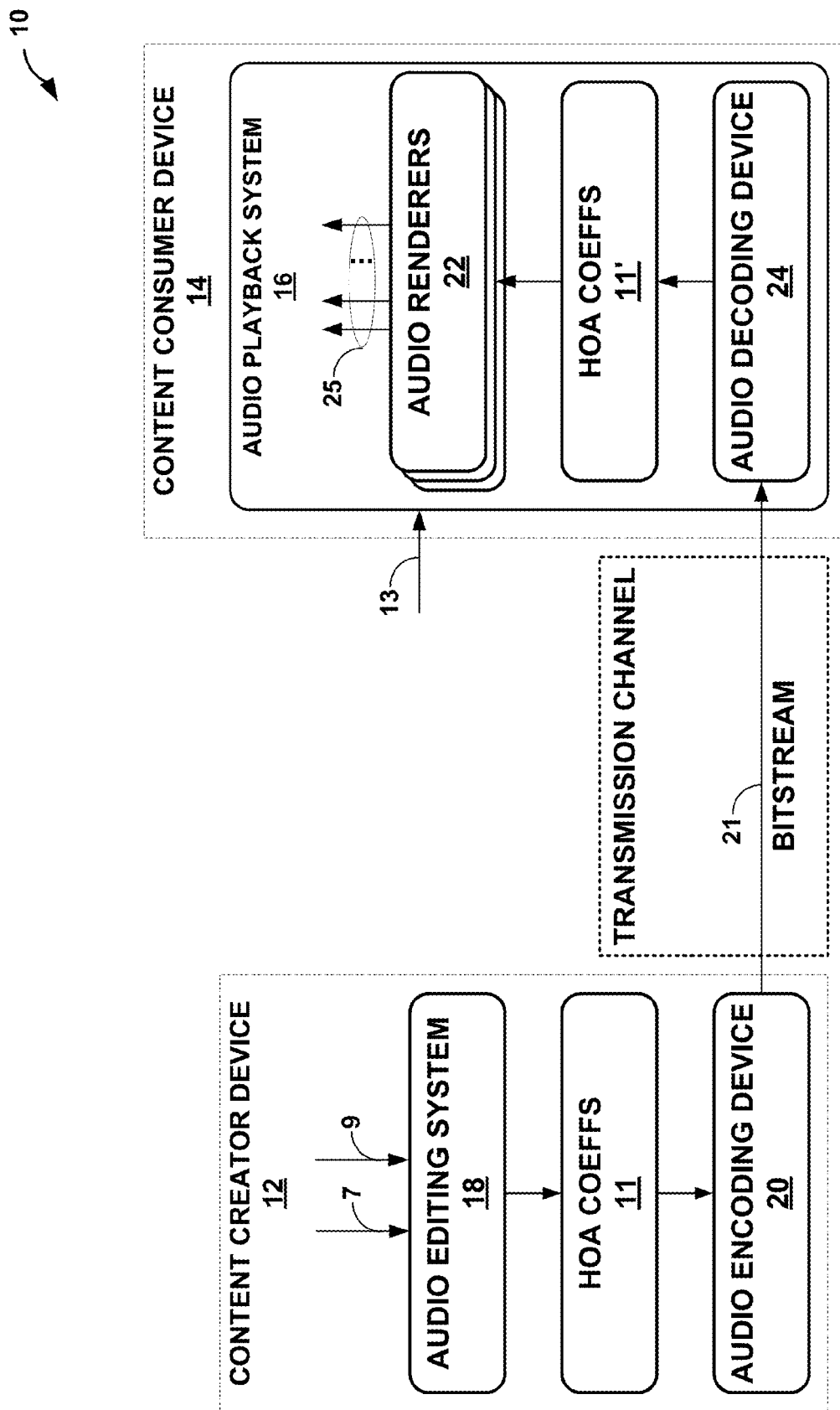
FIG. 2 is a diagram illustrating a system that may perform various aspects of the techniques described in this disclosure.

FIG. 2 is a diagram illustrating a system 10 that may perform various aspects of the techniques described in this disclosure. As shown in the example of FIG. 2, the system 10 includes a content creator device 12 and a content consumer device 14. While described in the context of the content creator device 12 and the content consumer device 14, the techniques may be implemented in any context in which SHCs (which may also be referred to as HOA coefficients) or any other hierarchical representation of a soundfield are encoded to form a bitstream representative of the audio data. Moreover, the content creator device 12 may represent any form of computing device capable of implementing the techniques described in this disclosure, including a handset (or cellular phone), a tablet computer, a smart phone, or a desktop computer to provide a few examples. Likewise, the content consumer device 14 may represent any form of computing device capable of implementing the techniques described in this disclosure, including a handset (or cellular phone), a tablet computer, a smart phone, a set-top box, or a desktop computer to provide a few examples.

The content creator device 12 may be operated by a movie studio or other entity that may generate multi-channel audio content for consumption by operators of content consumer devices, such as the content consumer device 14. In some examples, the content creator device 12 may be operated by an individual user who would like to compress HOA coefficients 11. Often, the content creator generates audio content in conjunction with video content. The content consumer device 14 may be operated by an individual. The content consumer device 14 may include an audio playback system 16, which may refer to any form of audio playback system capable of rendering SHC for play back as multi-channel audio content.

The content creator device 12 includes an audio editing system 18. The content creator device 12 obtain live recordings 7 in various formats (including directly as HOA coefficients) and audio objects 9, which the content creator device 12 may edit using audio editing system 18. The content creator may, during the editing process, render HOA coefficients 11 (abbreviated in FIG. 2 as "HOA coeffs 11") from audio objects 9, listening to the rendered speaker feeds in an attempt to identify various aspects of the soundfield that require further editing. The content creator device 12 may then edit HOA coefficients 11 (potentially indirectly through manipulation of different ones of the audio objects 9 from which the source HOA coefficients may be derived in the manner described above). The content creator device 12 may employ the audio editing system 18 to generate the HOA coefficients 11. The audio editing system 18 represents any system capable of editing audio data and outputting the audio data as one or more source spherical harmonic coefficients. The audio editing system 18 may be configured to, as described in more detail below with respect to FIGS. 4-19, perform the audio editing techniques described in this disclosure.

When the editing process is complete, the content creator device 12 may generate a bitstream 21 based on the HOA coefficients 11. That is, the content creator device 12 includes an audio encoding device 20 that represents a device configured to encode or otherwise compress HOA coefficients 11 in accordance with various aspects of the techniques described in this disclosure to generate the bitstream 21. The audio encoding device 20 may generate the bitstream 21 for transmission, as one example, across a transmission channel, which may be a wired or wireless channel, a data storage device, or the like. The bitstream 21 may represent an encoded version of the HOA coefficients 11 and may include a primary bitstream and another side bitstream, which may be referred to as side channel information.

While shown in FIG. 2 as being directly transmitted to the content consumer device 14, the content creator device 12 may output the bitstream 21 to an intermediate device positioned between the content creator device 12 and the content consumer device 14. The intermediate device may store the bitstream 21 for later delivery to the content consumer device 14, which may request the bitstream. The intermediate device may comprise a file server, a web server, a desktop computer, a laptop computer, a tablet computer, a mobile phone, a smart phone, or any other device capable of storing the bitstream 21 for later retrieval by an audio decoder. The intermediate device may reside in a content delivery network capable of streaming the bitstream 21 (and possibly in conjunction with transmitting a corresponding video data bitstream) to subscribers, such as the content consumer device 14, requesting the bitstream 21.

Alternatively, the content creator device 12 may store the bitstream 21 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content stored to the mediums are transmitted (and may include retail stores and other store-based delivery mechanism). In any event, the techniques of this disclosure should not therefore be limited in this respect to the example of FIG. 2.

As further shown in the example of FIG. 2, the content consumer device 14 includes the audio playback system 16. The audio playback system 16 may represent any audio playback system capable of playing back multi-channel audio data. The audio playback system 16 may include a number of different renderers 22. The renderers 22 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16 may further include an audio decoding device 24. The audio decoding device 24 may represent a device configured to decode HOA coefficients 11' from the bitstream 21, where the HOA coefficients 11' may be similar to the HOA coefficients 11 but differ due to lossy operations (e.g., quantization) and/or transmission via the transmission channel. The audio playback system 16 may, after decoding the bitstream 21 to obtain the HOA coefficients 11' and render the HOA coefficients 11' to output loudspeaker feeds 25. The loudspeaker feeds 25 may drive one or more loudspeakers (which are not shown in the example of FIG. 2 for ease of illustration purposes).

To select the appropriate renderer or, in some instances, generate an appropriate renderer, the audio playback system 16 may obtain loudspeaker information 13 indicative of a number of loudspeakers and/or a spatial geometry of the loudspeakers. In some instances, the audio playback system 16 may obtain the loudspeaker information 13 using a reference microphone and driving the loudspeakers in such a manner as to dynamically determine the loudspeaker information 13. In other instances or in conjunction with the dynamic determination of the loudspeaker information 13, the audio playback system 16 may prompt a user to interface with the audio playback system 16 and input the loudspeaker information 13.

The audio playback system 16 may then select one of the audio renderers 22 based on the loudspeaker information 13. In some instances, the audio playback system 16 may, when none of the audio renderers 22 are within some threshold similarity measure (in terms of the loudspeaker geometry) to the loudspeaker geometry specified in the loudspeaker information 13, generate the one of audio renderers 22 based on the loudspeaker information 13. The audio playback system 16 may, in some instances, generate one of the audio renderers 22 based on the loudspeaker information 13 without first attempting to select an existing one of the audio renderers 22.

Figure 3:
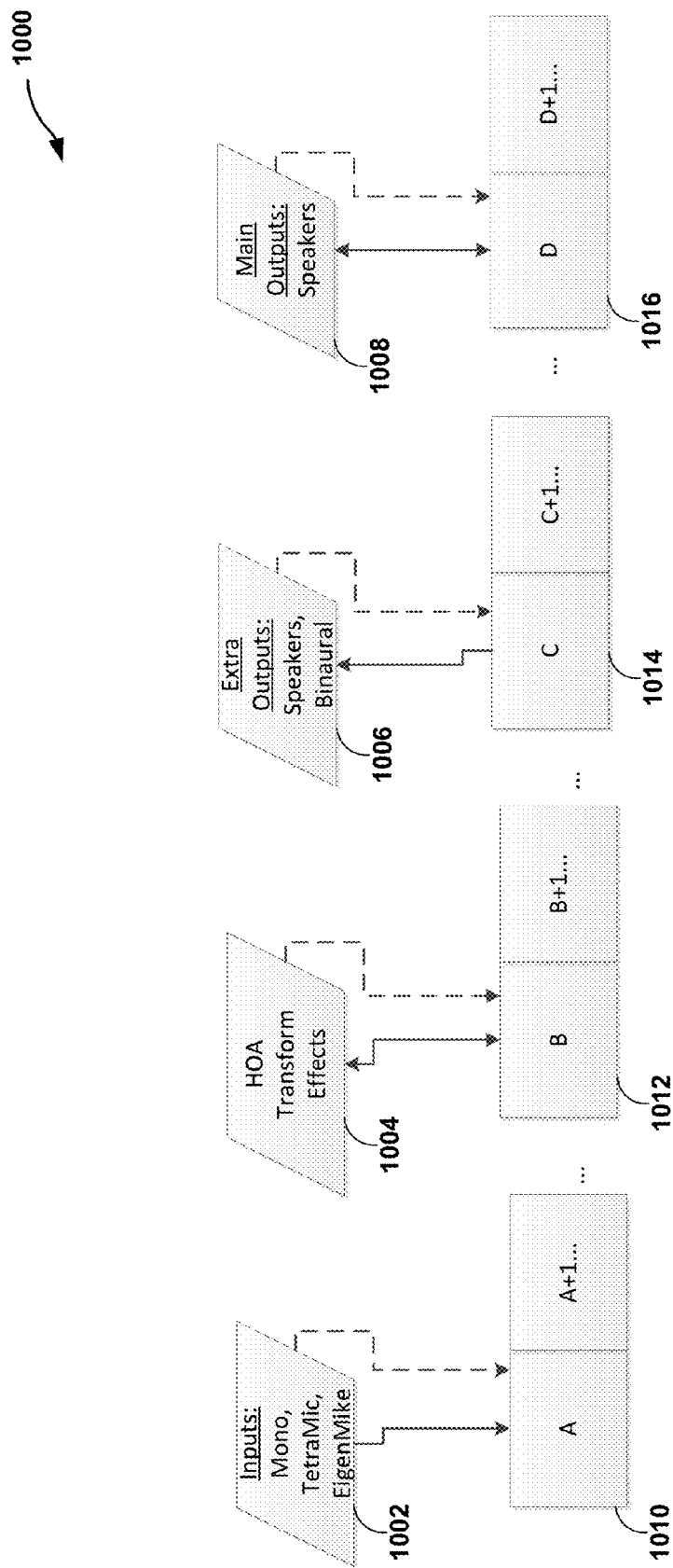
FIG. 3 is a block diagram illustrating an example buffer architecture that may include, be, or be part of the audio editing system of FIG. 2.

FIG. 3 is a block diagram illustrating an example buffer architecture 1000 that may include, be, or be part of the audio editing system 18 of FIG. 2. The buffer architecture 1000 of FIG. 3 represents one example implementation of the audio editing system 18, in which the audio editing system 18 may implement a circular buffer architecture to provide a bridge or HOA buss between audio input data and an output format that conforms to any of various speaker layouts. In various examples, the content creator 12 may implement buffer architecture 1000 in conjunction with audio plug-in technology to receive audio inputs of a given format, such as the 7.1 format (e.g., as used in conjunction with Blu-Ray® video format), and output the audio data to conform to one or more speaker layouts. Examples of speaker layouts conformant to which the buffer system 1000 may output audio data include, but are not limited to, 12-speaker and 22-speaker layouts. As examples, the content creator 12 may implement the buffer system 1000 to receive an audio input that conforms to the 7.1 format, and output audio data that conforms to one of various other formats, such as the 22.2 format, the 28.2 format, or the 10.1 format.

In some examples, Digital Audio Workstations (DAWs) are based upon panning audio tracks to a pre-defined speaker layout. A potential issue with the panning-based DAWs is that for a spherical harmonics (SH) based approach, the final speaker layout (to which an output is to conform) is unknown. As a result, a buss (e.g., a patch lead that connects input and output tracks) that identifies a particular speaker layout type may not serve a purpose in the DAWs, because the ultimate speaker layout is unknown.

Another potential issue with the DAWs is that the speaker layout types are predetermined by software. In most instances, the predetermined speaker layout conforms to a 7.1 format. For high resolution spatial audio using spherical harmonics (SH) or higher-order ambisonics (HOA), the track count for 6th order may be 49, representing the SH coefficients in real-time. As a result, the DAW may be required to convert a multitude of audio tracks into the HOA domain of 49 or more coefficients. In turn, the DAW and/or an audio output device may be required to render the SH coefficients to different layout configurations above 7.1, such as 22.2 format, 28.2 format, 10.1 format, etc.

Techniques of this disclosure, such as those implemented using the buffer system 1000 of FIG. 3, may provide one or more potential advantages over existing audio plug-in solutions. As an example, an audio plug-in implemented in conjunction with the buffer system 1000 may run on industry standard software/hardware that is limited to the 7.1 format. Techniques of this disclosure are directed to a 'behind-the-scenes' HOA buss between various different plug-ins within a multi plug-in suite. The techniques also maintain communication between the plug-ins using open sound control ("OSC"). In examples, OSC is a protocol for data communication between different applications.

In various instances, the buffer system 1000 may be described as a circular block of buffers within shared memory. One or more SH encoder plug-ins may write at the first position of buffers. Additionally, plug-ins may then read the buffer at least two blocks of buffers ahead, to manipulate the entire HOA signal. After the two subsequent blocks, the slave speaker may output the audio data, and binaural plug-ins may read the block. Finally, the output plug-in reads the HOA two blocks after, and clears the memory. In this manner, the audio editing system 18 can, in two blocks, write to the buffer once again.

Several plugins may be available (e.g., which may be configured to convert mono/stereo audio data to the HOA domain), and EigenMike® and tetrahedral microphone ("TetraMic") inputs are supplied to the HOA stream(s). As a result, these inputs may need to be added to the stream(s), causing the output plug-in to clear the buffer. At least two block gaps may exist, due to the parallel processing nature of DAWs. It is not guaranteed in which order a certain track will be passed to which time-block of audio, although this has to be within constraints, due to attempts to achieve a 'real-time' reproduction. The block size and number of blocks can be altered to allow for the real-time reproduction. To overcome the output limitation, one or more output plug-ins may be implemented, and time-alignment of the respective outputs with the main output may be implemented, so that the sound field is unaltered when rendered.

In some examples, plug-ins and/or DAWs render the channels to which the channels have been assigned, such as by a user. In other words, these plug-ins are channel-based, in that the number of channels of the audio input are equal to the number of channels that are rendered at output. Various DAWs may be configured to receive individual components of an audio input, and then mix the components together according to a specified speaker configuration, to generate the output audio data. For instance, a DAW may receive components of a mono audio feed, such as musical tracks including vocals, and each of one or more instruments. In turn, the DAW may mix the vocal and instrumental tracks together according to a specified speaker layout. However, existing DAWs may be limited to rendering a number of output channels that is equal to the number of input channels. For instance, if the input tracks conform to a 7.1 format, an existing DAW may be limited to rendering the output audio data according to only a 7.1 format.

Techniques of this disclosure are directed to ways by which the output plug-in may render all signals of the input audio data, to conform to various speaker layouts. In some examples, the techniques are directed to converting the tracks of the input audio data (e.g., mono audio data) into the higher order ambisonics (HOA) domain. In other examples, the techniques are directed to receiving input audio data that is in the HOA domain, such as input audio data captured by an EigenMike® or a TetraMic. In any of these instances, the techniques are directed to rendering the audio data in the HOA domain into any of a variety of speaker configurations for output.

To implement the techniques of this disclosure, the audio editing system 18 may implement the buffer architecture 1000 of FIG. 3 as a circular buffer system. For instance, the audio editing system 18 may position each of buffers 1010, 1012, 1014, and 1016 at a two-block distance from the previous and/or subsequent buffer. More specifically, the audio editing system 18 may position buffer 1012 two blocks after buffer 1010. In turn, the audio editing system 18 may implement the buffer 1014 two blocks after the buffer 1012. Similarly, the audio editing system 18 may position the buffer 1016 two blocks after the buffer 1014. The audio editing system 18 may implement the buffer architecture 1000 by implementing read/write functionalities with respect to the input audio data 1002 at the buffer 1010. As shown in FIG. 3, the input audio data 1002 may include mono audio data (e.g., audio data that the audio editing system may convert from the spatial domain into the HOA domain) and/or audio data captured with by an EigenMike or TetraMic (e.g., audio data that is ready to be stored in the HOA domain).

Additionally, the audio editing system 18 may transfer the input audio data 1010 from the buffer 1010 to the buffer 1012. In turn, the audio editing system 18 may apply the HOA transform effects 1004 to the audio data 1002, once the input audio data 1002 has been transferred to the buffer 1012. By applying the HOA transform effects 1004 to the input audio data 1002 after the input audio data 1002, the audio editing system 18 may express the input audio data 1002 in the HOA domain. In this manner, the audio editing system 18 may apply the HOA transform effects 1004 to the input audio data 1002 at the buffer 1012, thereby freeing the buffer 1010 (positioned two blocks before) to receive and store new audio inputs. Thus, the circular buffer design of the buffer architecture 1000 enables the audio editing system 18 to reuse the buffer 1010 for newly received input audio data, while storing the HOA-represented input audio data 1002 at the buffer 1012.

The audio editing system 18 may transfer the HOA-represented input audio data 1002 to the buffer 1014. While the HOA-represented input audio data 1002 are stored at the buffer 1014, the audio editing system 18 may process the HOA-represented input audio data 1002 using the extra output plugins 1006. As shown in FIG. 3, the extra output plugins 1006 may include one or more speaker plugins and/or one or more binaural plugins. In examples, the audio editing system 18 may apply the extra output plugins 1006 to render the HOA-represented audio data 1002 for output using one or more extra output speakers and/or one or more binaural output devices.

In turn, the audio editing system 18 may transfer the HOA-represented input audio data 1002 to the buffer 1016. While the HOA-represented input audio data 1002 are stored at the buffer 1016, the audio editing system 18 may process the HOA-represented input audio data 1002 using the main output plugin 1008. As shown in FIG. 3, the main output plugin 1008 may include one or more speaker plugins. In examples, the audio editing system 18 may apply the main output plugins 1006 to render the HOA-represented audio data 1002 for output using one or more main output devices (e.g., main output speakers).

By implementing the circular buffer design of the buffer architecture 1000, the audio editing system 18 may more efficiently use computing resources to render the input audio data 1002. For instance, at a given instance of time, each of the buffers 1010, 1012, 1014, and 1016 may store different frames of the input audio data 1002, at various stages of processing. After the processing of audio frames by the main output plugin 1008, the audio editing system 18 may erase the buffer 1016, transfer the data of each of the buffers 1012 and 1014 forward, and then store new audio input frames to the buffer 1010. Thus, the audio editing system 18 may implement the circular buffer design of the buffer architecture 1000 to more efficiently process (and render) the input audio data 1002. Additionally, by implementing the buffer architecture 1000 in the circular buffer design described herein, the audio editing system 18 may maintain each of the buffers 1010-1016 at a fixed memory size, without having to expand or contract the memory size of any of the buffers 1010-1016.

The circular buffer design of the buffer architecture 1000 may further enable the audio editing system 18 to use a greater amount of shared memory (in the form of the buffers 1010-1016) to share audio signals, such as speaker signals that are rendered and/or output by the extra output plugins 1006 and/or the main output plugins 1008. For instance, as described above the audio editing system 18 may time-stagger the processing of the input audio data 1002 across the buffers 1010-1016. By time-staggering the processing of the input audio data 1002 across the buffers 1010-1016, the audio editing system 18 may perform time-alignment of the positioning of the input audio data 1002, at various stages of processing by the plugins 1002-1008.

According to one or more implementations of the techniques described herein, several HOA streams may represent different orders/functions. It will be appreciated that, in various implementations of the techniques, the audio editing system 18 may use either a single HOA stream or multiple HOA streams in processing the input audio data 1002 using the circular buffer design of the buffer architecture 1000. Further details of techniques by which the audio editing system 18 may use the buffer architecture 1000 to improve resource usage are described below, with respect to FIG. 4.

Figure 4:
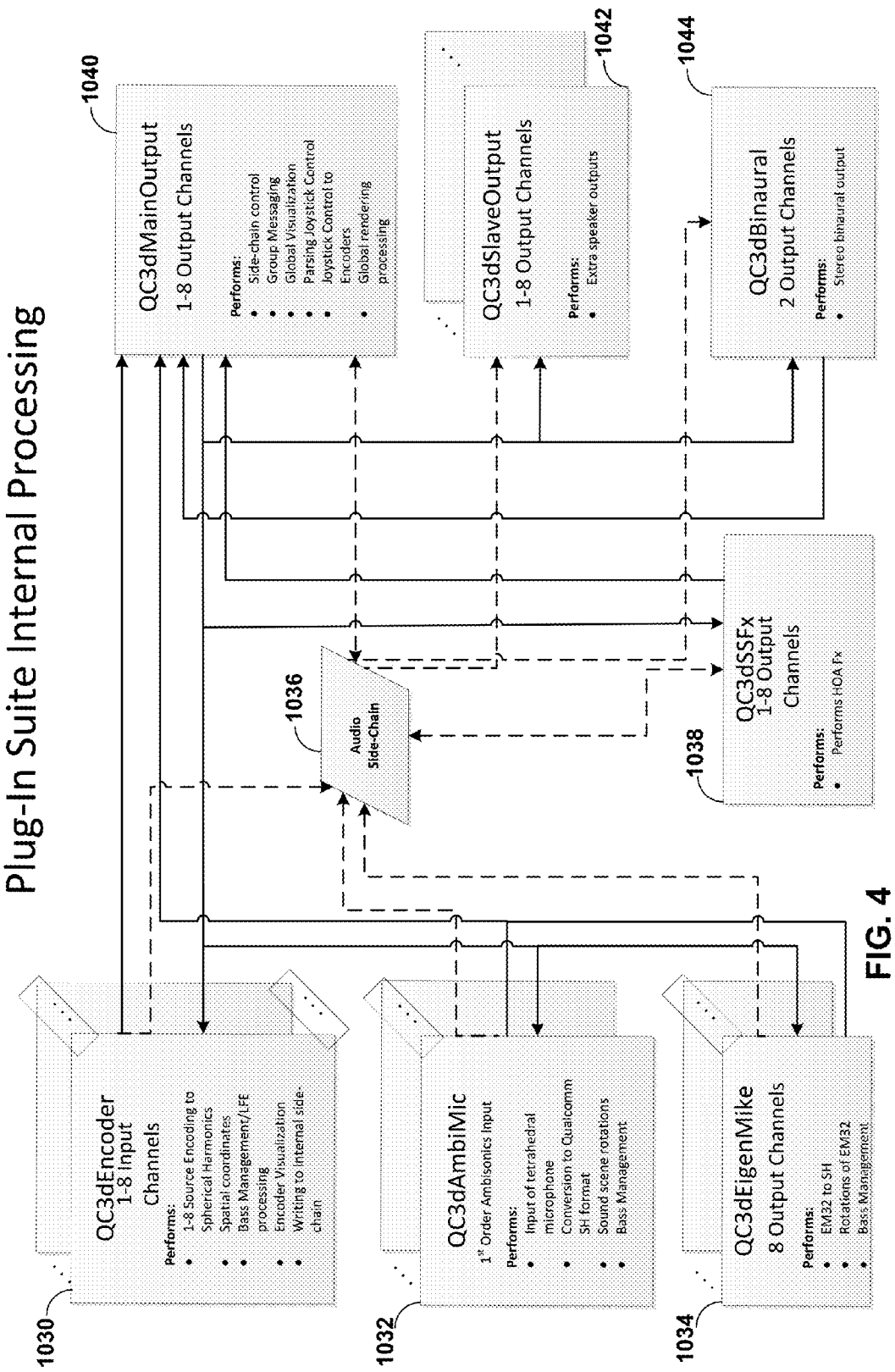
FIG. 4 is a conceptual diagram illustrating a connection schematic for techniques described above with respect to FIG. 3.

FIG. 4 is a conceptual diagram illustrating a connection schematic for techniques described above with respect to FIG. 3. In the example of FIG. 4, connections illustrated in solid lines indicate connections that carry inter-plug-in messages and communications. Connections illustrated in dashed lines indicate internal audio side-chain communications. The audio side-chain 1036 of FIG. 4 is associated with the shared buffer described herein. The connection schematic illustrated in FIG. 4 also includes various input plug-ins and various output plug-ins. Examples of input plug-ins illustrated in FIG. 4 include the encoder plug-in 1030 and the ambisonics microphone (or "AmbiMic") plug-in 1032. In the specific example of FIG. 4, the encoder plug-in is configured to provide a number of input channels between one and eight. The AmbiMic plug-in 1032 is configured to provide input conforming to the first order of ambisonics. The input of the AmbiMic plug-in 1032 may correspond to the input(s) of a tetrahedral microphone, or "TetraMic."

Examples of output plug-ins illustrated in FIG. 4 are the EigenMike® plug-in 1034, the SSFx plug-in 1038, the main output plug-in 1040, the slave output plug-in 1042, and the binaural plug-in 1044. The EigenMike® plug-in 1034 is configured to provide eight output channels, and the binaural plug-in 1044 is configured to provide two output channels. Each of the SSFx plug-in 1038, the main output plug-in 1040, and the slave output plug-in 1042 is configured to provide a number of output channels between one and eight.

In various examples, the audio editing system 18 may implement the connection schematic of FIG. 4 such that one or more of the output buffers 1038-1044 may split up a rendering matrix for the 22.2 format into three sub-matrices. In turn, the main output plugin 1040 may apply one of the sub-matrices to a 7.1 format HOA representation of the input audio data, and the slave output plugin 1042 may apply the remaining two sub-matrices to 7.1 format HOA representations of the input audio data. For example, the main output plugin 1040 and the slave output plugin 1042 may apply the three sub-matrices derived from the 22.2 format rendering matrix to the 7.1. format input audio data, to form three different 7.1 setups for the rendered audio data. In some examples, the main output plugin 1040 and the slave output plugin 1042 may apply the derived sub-matrices to input audio data obtained from the audio side-chain 1036 (e.g., via the circular buffer design described above with respect to FIG. 3).

FIGS. 5-10 are flowcharts illustrating example processes by which the audio editing system 18 may implement techniques of this disclosure to alter a direction (which may also be referred to as "directional information") for audio objects of a soundfield. In various scenarios, it may be desirable for a spatial audio plug-in to be modified, whereby a sound source can be delayed and is heard in a different spatial position. However, if multiple sets of spherical harmonic basis functions need to be calculated per sound source, then altering the sound source may potentially increase CPU usage for the real-time audio processing. Additionally, it may be desirable to implement efficient processes by which a user may set the delay positions, rather than controlling azimuth and elevation for each delay.

Due to the symmetrical properties of the spherical harmonic (SH) basis functions, it may be possible to define a set of rules (e.g., one or more rules) for the sign changing of an SH basis function. It may also be possible to define a set of rules for swapping of a basis function pair (e.g. 2,−2 and 2,+2) for 0, 90, 180 and 270 degree rotations within the same hemisphere. Furthermore, it may be possible to pre-determine the sign swapping needed, and any basis function switching needed, for mirroring the sound source into an opposing hemisphere about the horizontal plane. These predeterminations can be combined to obtain the channel number and sign needed to change the position of the current known basis functions into other octants of the sphere.

In various examples, the mirroring of audio objects at the 270 degree position may be accomplished by combining the processes for mirroring audio objects at 90 and 180 degree positions, as disclosed herein. For instance, a more efficient or resource-conserving operation may be based on performing a same hemisphere calculation. In turn, a hemisphere flip may then be needed. The described operation(s) may be used to generate a 3D delay effect. The outcome of the rotation and flip techniques is that for each octant, a $1 \times (N+1)^2$ set of integers may be obtained, that contain the spherical harmonic number and a sign, these can be held separately within software.

According to one implementation of the techniques described herein, the audio editing system 18 may write an HOA input to a buffer equal in length to the maximum delay time in the corresponding sample. By using different read positions along with a particular octant (e.g., as specified in a user input) and gain reduction in conjunction with the buffer for all the 'd' delays used, the audio editing system 18 may form or obtain the output HOA. As a result, the audio editing system 18 may obtain a delay to move a sound source around in rotations (e.g., increments) of 90 degrees, and to flip the hemisphere being used. Due to mirroring about the horizontal plane, there are two positions where there will not be eight unique results. These two positions are identified by elevation values of 0 degrees, or +/−90 degrees. Described with respect to FIG. 3, various techniques of this disclosure may include manipulating the basis functions of the second order (n=2). Various examples of manipulation of the second order basis functions include swapping the basis functions among one another, rotation of the basis functions, or multiplying the basis functions by a constant value to thereby rotate the basis functions.

When the elevation is the horizontal plane, the hemisphere flip has no effect. Additionally, when a source is at +/−90 then then all quadrants of a hemisphere are the same. The rotation and flip-based methodology described herein is based on the relationship between the pairs of SH basis functions. In other words, the techniques described herein are based on the corresponding +/−m, and the number of even and odd basis pairs. Other methodologies for creating a spatial delay include using rotations of the sound field or calculating the basis functions. Such methodologies offer eight different delay positions relative the origin. In turn, such methodologies afford significant amount of control to a user. Other uses for the octant(s) may include generating a wider source position image by using all of the positions in weighted unison.

As used below, the "flipper_val" may represent an array of indexes, each of which identifies a different spherical basis function up to the maximum order N of the current HOA representation. The flipper_val array may have a length of the current maximum order (e.g. 49 positions for 6th order HOA representation). The flipper_val array may be modified to allow for the following two functions:
1. Swapping spherical basis functions; and
2. Changing the sign of the spherical basis functions (which may swap the positive extends and negative extends).

When no rotation is to be applied, the flipper_val array may store indexes of 0, 1, 2, 3 . . . 48 in this scenario.

In some cases, the audio editing system 18 may swap indexes of sub-order pairs, e.g. for 90 degree rotation, the flipper_val array may yield y(0,0), y(1, +1),y(1, −1), y(1,0) and so forth, swapping the indexes in the flipper_val array for the y(1, +1) and the y(1, −1). Thus, the flipper_val array may store indexes of: 0, 2, 1, 3 and so on, based on the relevant calculations. For audio objects at the 270 degree position, which may require the same switch, but also a sign flip, the indexes stored to the flipper_val array may be 0,−2, 1, 3 . . . and so on.

The foregoing indexing where the zeroth order spherical basis function has an index of zero, the first order, positive one sub-order spherical basis function has an index of one, the first order, negative one sub-order spherical basis function has an index of two, the first order, zeroth sub-order spherical basis function has an index of three, etc. is referred to as symmetric order indexing. Although described herein with respect to the symmetric order indexing, the techniques may be performed with respect to other indexing schemes, including a linear ordering format. More information regarding various indexing schemes (which may also be referred to as ordering formats) can be found in U.S. patent application Ser. No. 14/630,165, entitled "ORDER FORMAL SIGNALING FOR HIGHER-ORDER AMBISONIC AUIDO DATA," filed Feb. 24, 2015.

In the horizontal flipping case, the flipper_val array has already been calculated based on the rotation, and then when the other hemisphere is to be used it undergoes a 2nd modification. In horizontal flip, only a possible change of sign may apply, so no swapping of the basis functions may be required. Thus, in these scenarios, the flipper_val array may be modified as follows:
1. Rotation of 0|90|180|270 for initial flipper_val
2. Optional: modification of sign only to change hemisphere The described operations may also be performed in reverse order from the description above.

Figure 5:
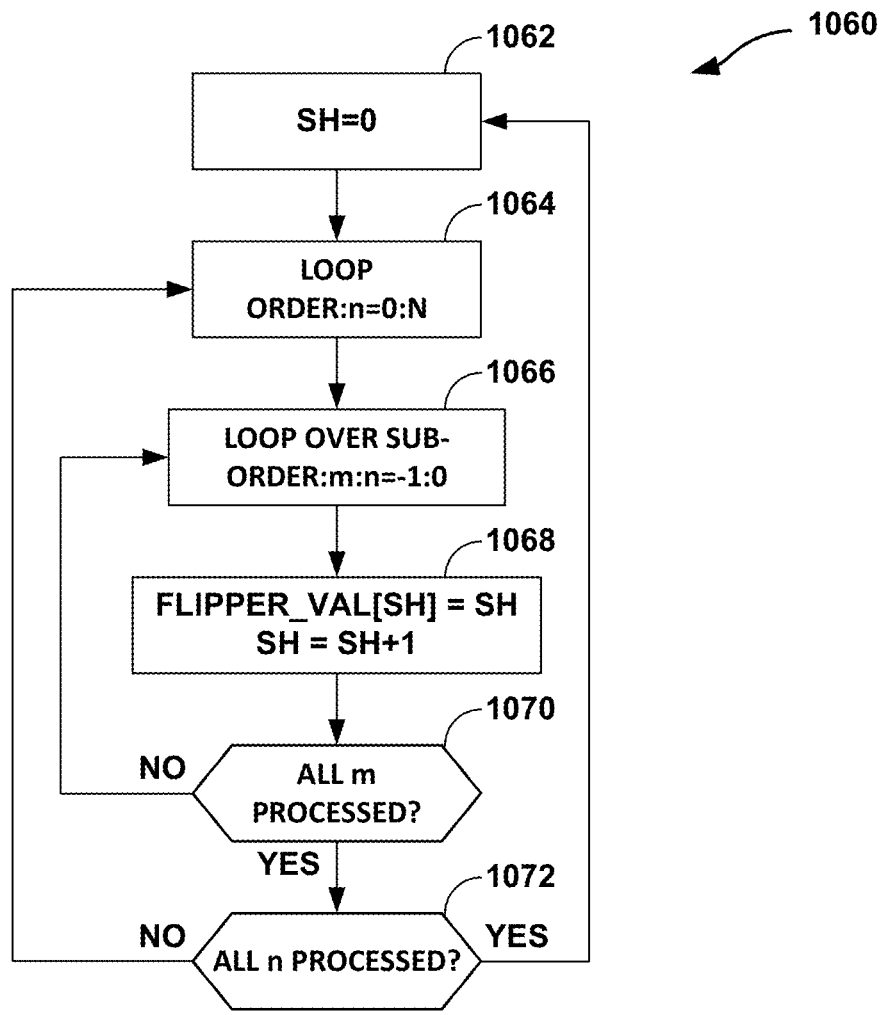
FIG. 5 is a flowchart illustrating a process by which the audio editing system may modify spherical basis functions to rotate an audio object by zero degrees.

FIG. 5 is a flowchart illustrating a process 1060 by which the audio editing system 18 may modify spherical basis functions to rotate an audio object by zero degrees. For the zero degree rotation and any of the other rotations (e.g., by 90, 180, 270 degrees), the horizontal mirroring and the source tail effect, the HOA coefficients represent only the audio object and not an entire soundfield. As such, the HOA coefficients may rotate only the location of the audio object in space and not the entire soundfield in which the audio object may exist, contrary to rotation used for example in compressing HOA coefficients by aligning various prominent audio objects with one or more of the x-axis, y-axis and z-axis.

In any event, at the step 1062 of the process 1060 of FIG. 5, the audio editing system 18 may initialize a counter value ("sh") to the value of zero. The variable 'sh' may represent an index into the flipper_val array. In turn, the audio editing system 18 may execute a loop to iterate through the orders, incrementing a variable 'n' from a value of zero to a maximum order value denoted by the variable 'N' (1064). Additionally, the audio editing system 18 may loop over the positive sub-orders, initializing the variable 'm' to be equal to the current value of 'n' and decrementing by 1 (or adding a −1 after each loop) until the variable 'm' equals zero (1066). An example of the looping operation that the audio editing system 18 may implement at the step 1066 is described below with respect to FIG. 13.

To rotate the audio object 0 degrees, the audio editing system 18 may set the flipper_val array with the current sh value to be equal to the current sh value (which does not alter or otherwise change the positions of the spherical basis functions in the flipper_val array given that a zero degree rotation does not rotate the soundfield). The audio editing system 18 may also increment the sh value by one (1068).

In turn, the audio editing system 18 may determine whether the audio editing system 18 has processed all of the positive sub-orders of the n-ordered spherical basis functions (1070). If positive sub-orders of the n-ordered spherical basis function remain unprocessed ("NO" 1070), the audio editing system 18 may continue to loop over the sub-orders of the current order n spherical basis functions (1066, 1068). When all of the sub-orders of the current order n spherical basis functions have been processed ("YES" 1070), the audio editing system 18 may determine whether all of the orders (n ranging from 0 to the maximum order N) of the spherical basis functions have been processed (1072). When all of the orders of the spherical basis functions have been processed ("YES" 1072), the audio editing system 18 may perform adjustments for new spherical basis functions when the zero rotation process is again invoked.

Figure 15:
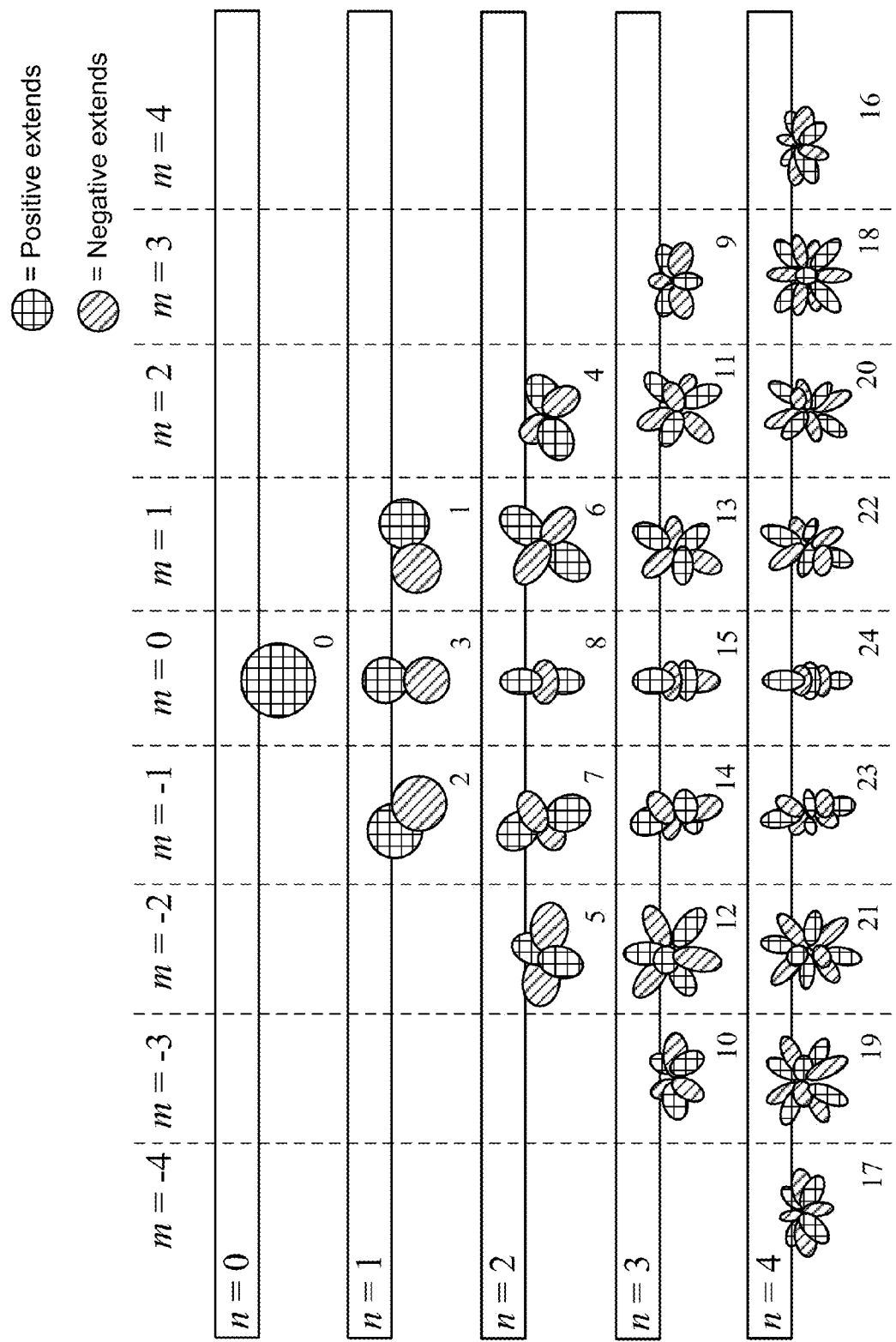
FIGS. 15-19 are diagrams illustrating the result of applying the foregoing process shown in FIGS. 5-9 to the spherical basis functions shown in the example of FIG. 1.

FIG. 15 is a diagram illustrating the result of applying the foregoing process 1060 to the spherical basis functions shown in the example of FIG. 1. In the example of FIG. 15, the orders of spherical basis functions are shown in each row, while the sub-orders are shown in each column. The numeral below each basis function may denote the assigned index to the spherical basis function. The spherical basis functions shown in FIGS. 1 and 15 do not differ as the rotation of zero degrees does not modify the spherical basis functions.

The audio editing system 18 may render the higher order ambisonic coefficients using the manipulated SH basis functions to a plurality of speaker feeds similar to that described above with respect to the audio playback device 16 for purposes of auditioning the edited audio data. The audio editing system 18 may drive a plurality of speakers using the plurality of speaker feeds such that the location of the audio object appears to originate 0 degrees to the right or the left from which the audio object appears using the SH basis functions prior to being manipulated.

Figure 6:
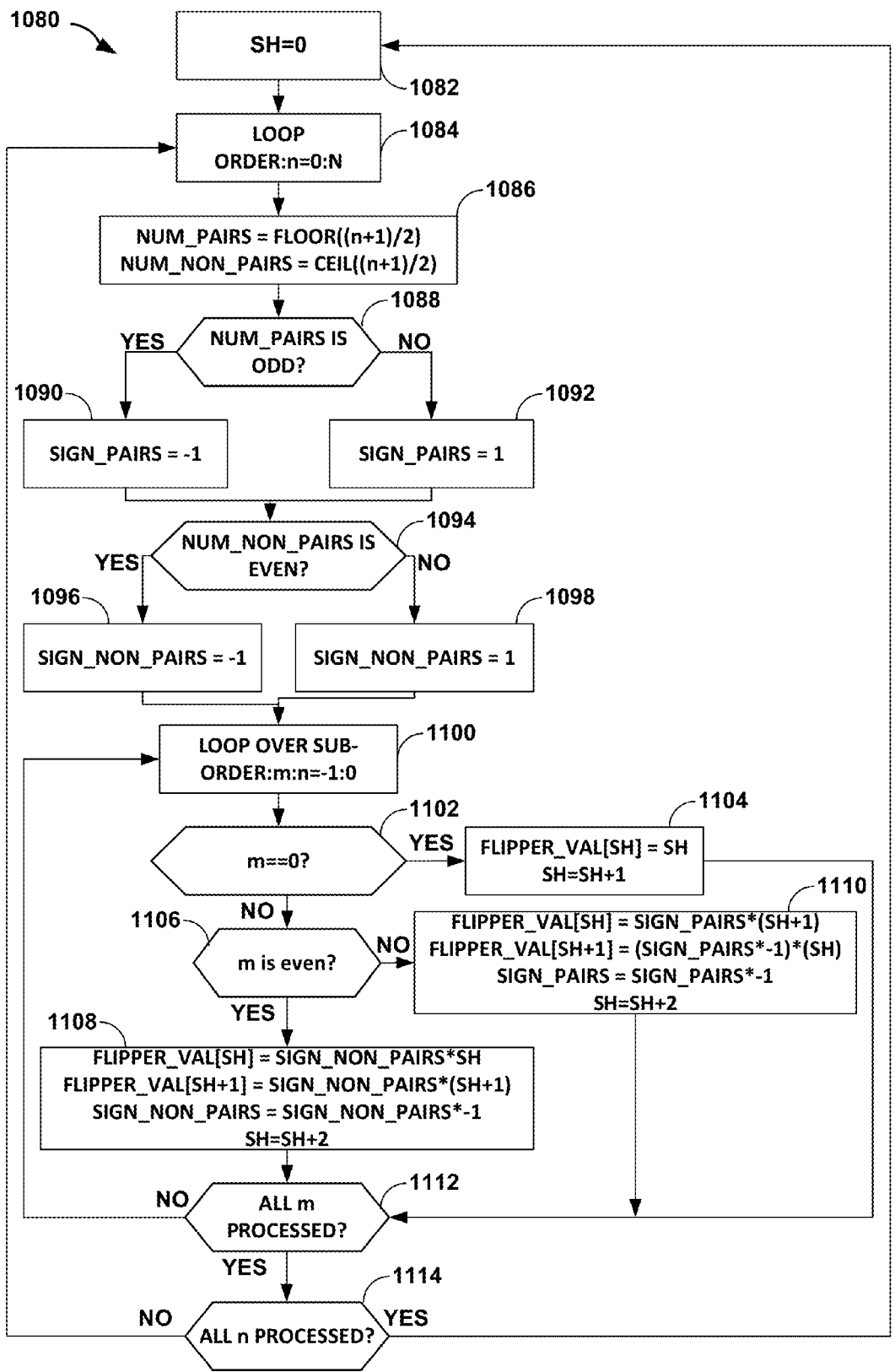
FIG. 6 is a flowchart illustrating an example process by which the audio editing system may rotate an audio object by 90 degrees in accordance with the spherical basis function manipulation techniques described in this disclosure.

FIG. 6 is a flowchart illustrating an example process 1080 by which the audio editing system 18 may rotate an audio object by 90 degrees in accordance with the spherical basis function manipulation techniques described in this disclosure. In various examples, the audio editing system 18 may apply the process 1080 of FIG. 6 to manipulate spherical basis functions in the flipper_val array to rotate the audio object by 90 degrees.

Figure 13:
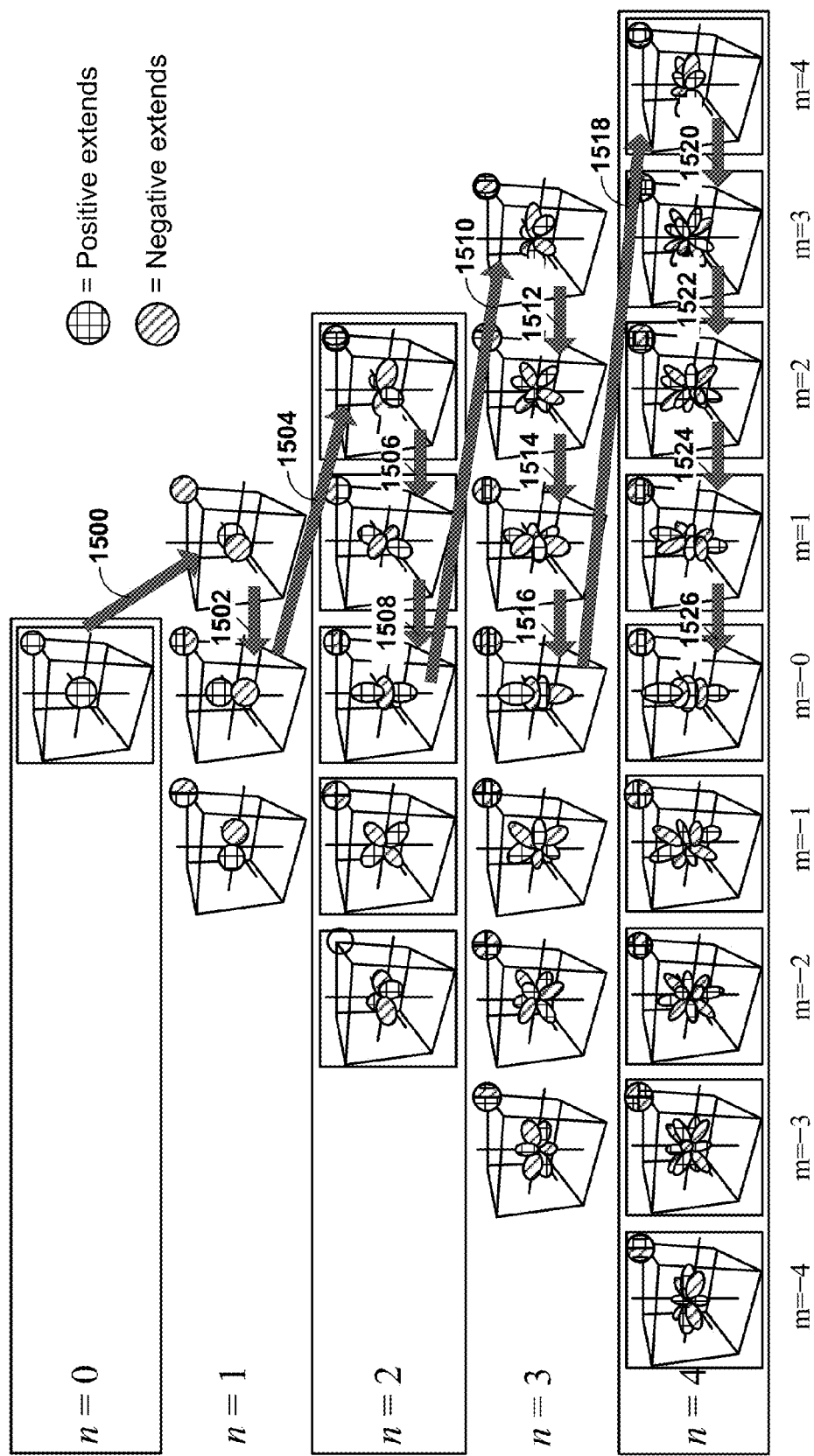
FIG. 13 is a diagram illustrating a looping process as described above with respect to FIGS. 5-10.

The audio editing system 18 may apply the process 1080 according to the following pseudocode:

```
Begin [Process spherical basis functions to rotate the soundfield by 90 degrees]
Initialize counter value 'sh' to 0
Define loop order of order 'n' as ranging from 0 to predefined ceiling 'N'
Initialize number of pairs to a floor of [(n+1)/2]
Initialize number of non-pairs to a ceiling of [(n+1)/2]
If Number of pairs is odd
    { initialize sign of pairs = −1 }
Else
    {initialize sign of pairs = 1}
If number of non-pairs is even
    { sign of non-pairs = −1 }
Else
    { sign of non-pairs = 1 }
Loop over sub-orders of current order n, by moving from sub-order m=n to 0, etc.
/*See FIG. 13 for looping operations */
If coefficient m == 0
    { apply flipper_val[sh] according to 90 degrees scenario;
        Increment sh by 1}
Else
{
    If m is even
    {set flipper_val [sh] for 90 degree scenario to the sign of the
    non-pairs * (sh);
    set flipper_val [sh+1] for 90 degree scenario to the sign of the
    non-pairs *
    (sh+1);
    invert sign of non-pairs;
    increment counter sh by two}
    Else
    {set flipper_val [sh] for 90 degree scenario to the sign of the
    pairs * (sh+1);
```

```
    set flipper_val [sh+1] for 90 degree scenario to the inverse of the
    sign of the non-pairs * (sh);
    invert sign of pairs;
    increment sh by two}
}
If all coefficients of current order n processed
{If all orders processed
    { process 1080 done until invoked again}
Else
    {continue to loop over available orders}
}
Else
    {continue to loop over coefficients of current order n}
```

The foregoing pseudocode may generally enable the audio editing system 18 to rotate an audio object by 90 degrees. According to the pseudocode, the audio editing system 18 may initialize the variable 'sh' to zero (1082). Next, the audio editing system 18 may loop over the orders of the spherical basis function, instantiating a variable 'n' with a value of zero and iterating from zero to the maximum order denoted by the variable 'N,' which may change depending on the resolution of the HOA representation (1086).

The audio editing system 18 may next determine a number of pairs ("NUM_PAIRS") and a number of non-pairs ("NUM_NON_PAIRS") for the current order 'n'. The pairs and non-pairs may refer to sub-order pairs within the same order, such as the spherical basis functions corresponding to order:sub-order of 1:+1 and 1:−1|2:+1 and 2:−1|2:+2 and 2:−2|3:+1 and 3:−1|3:+2 and 3:−2|3:+3 and 3:−3| etc. The number of pairs may denote the number of pairs that are to be swapped to perform the 90 rotation (where swapped may refer to swapping the index for one of the pair with the index of the other one of the pair in the flipper_val array). The number of non-pairs may refer to a number of the pairs that are not swapped, including the zero sub-order spherical basis functions.

To obtain the number of pairs, the audio editing system 18 may compute the number of pairs and the number of non-pairs in accordance with the following equations (1086):

NUM_PAIRS=FLOOR((n+1)/2); and

NUM_NON_PAIRS=CEIL((n+1)/2).

The FLOOR( ) function in the equations above may round down the result of (n+1)/2 to the nearest integer. When the variable n equals two for example, the value of NUM_PAIRS is equal to FLOOR(3/2), which equals one. The CEIL( ) function in the equations above may round up the result of (n+1)/2 to the nearest integer. When the variable n equals two again for purposes of example, the value of NUM_NON_PAIRS is equal to CEIL(3/2), which equals 2. For a current order n of two, one pair of spherical basis functions is swapped and two "pairs" of the spherical basis functions are not swapped (the zero sub-order basis function and, as described in more detail below, the spherical basis functions corresponding to order:sub-order of 2:2 and 2:−2).

The audio editing system 18 may next determine whether the value of NUM_PAIRS is odd. When the value of NUM_PAIRS is odd ("YES" 1088), the audio editing system 18 initializes a variable SIGN_PAIRS to negative one (1090). The SIGN_PAIRS variable may indicate whether to perform an inversion where the negative extends become the positive extends and the positive extends becomes the negative extends. When set to negative one, the SIGN_PAIRS variable indicates that the inversion is performed. When the value of NUM_PAIRS is not odd ("NO" 1088), the audio editing system 18 initializes a variable SIGN_PAIRS to a value of one (1092), which indicates that the inversion is not performed.

The audio editing system 18 next determines whether the NUM_NON_PAIRS is even (1094). When the value of NUM_NON_PAIRS is even ("YES" 1094), the audio editing system 18 initializes a variable SIGN_NON_PAIRS to negative one (1096). The SIGN_NON_PAIRS variable may indicate whether to perform an inversion with respect to the actual non-swapped pairs (excluding the zero sub-order "pair" which is not really a sub-order pair) where the negative extends become the positive extends and the positive extends becomes the negative extends. When set to negative one, the SIGN_NON_PAIRS variable indicates that the inversion is performed. When the value of NUM_NON_PAIRS is not even ("NO" 1094), the audio editing system 18 initializes a variable SIGN_NON_PAIRS to a value of one (1098), which indicates that the inversion is not performed.

After initializing the SIGN_PAIRS and the SIGN_NON_PAIRS for the current order, the audio editing system 18 may loop over the sub-order 'm', instantiating a variable 'm', setting m equal to the current value of n, looping and decrementing by one until m equals zero (1100). Through each loop, the audio editing system 18 may determine whether the variable 'm' equals zero (1102). When the variable 'm' has a value of zero ("YES" 1102), the audio editing system 18 may set the flipper_val[sh] to the same value currently stored to the sh location in the flipper_val array because the zero sub-order basis functions remain unchanged for rotation by 90 degrees. The audio editing system 18 may also increment the sh value by one (i.e., sh=sh+1 in the example of FIG. 6) (1104). When the value of the variable 'm' does not equal zero ("NO" 1102), the audio editing system 18 may determine whether the value of the variable 'm' is even (1106).

When the value of the variable 'm' is even ("YES" 1106), the audio editing system 18 performs the following operations (1108):

flipper_val[sh]=SIGN_NON_PAIRS*sh;

flipper_val[sh+1]=SIGN_NON_PAIRS*(sh+1);

SIGN_NON_PAIRS=SIGN_NON_PAIRS*−1; and

SH=SH+2

In other words, the audio editing system 18 may invert the non-swapped pairs (e.g., SH and SH+1 as the pairs are sequential in the symmetrical ordering format) depending on the value of SIGN_NON_PAIRS. The audio editing system 18 may also change the sign of the value of SIGN_NON_PAIRS to the opposite (e.g., 1 to −1 or −1 to 1), and increment SH by two (effectively transitioning SH to identify the first spherical basis function in the next pair either associated with the current order in the next order).

When the value of the variable 'm' is not even ("NO" 1106), the audio editing system 18 performs the following operations (1110):

flipper_val[sh]=SIGN_PAIRS*(SH+1);

flipper_val[sh+1]=SIGN_PAIRS*(SH);

SIGN_PAIRS=SIGN_PAIRS*−1; and

SH=SH+2

In other words, the audio editing system 18 may swap the pairs (e.g., SH and SH+1 as the pairs, as noted above, are sequential in the symmetrical ordering format and given that the flipper_val indexed to sh is replaced with a value of sh+1). The audio editing system 18 may also potentially invert the swapped pairs depending on the value of SIGN_PAIRS. The audio editing system 18 may further change the sign of the value of SIGN_PAIRS to the opposite (e.g., 1 to −1 or −1 to 1), and increment SH by two (effectively transitioning SH to identify the first spherical basis function in the next pair either associated with the current order in the next order).

Once any of the foregoing operations are complete (e.g., those operations performed when m==0, or when m is either even or odd), the audio editing system 18 may determine whether the audio editing system 18 has processed all of the positive sub-orders of the n-ordered spherical basis functions (1112). If positive sub-orders of the n-ordered spherical basis function remain unprocessed ("NO" 1112), the audio editing system 18 may continue to loop over the sub-orders of the current order n spherical basis functions (1100-1112). When all of the sub-orders of the current order n spherical basis functions have been processed ("YES" 1112), the audio editing system 18 may determine whether all of the orders (n ranging from 0 to the maximum order N) of the spherical basis functions have been processed (1114). When all of the orders of the spherical basis functions have been processed ("YES" 1114), the audio editing system 18 may perform adjustments for new spherical basis functions when the zero rotation process is again invoked.

Figure 16:
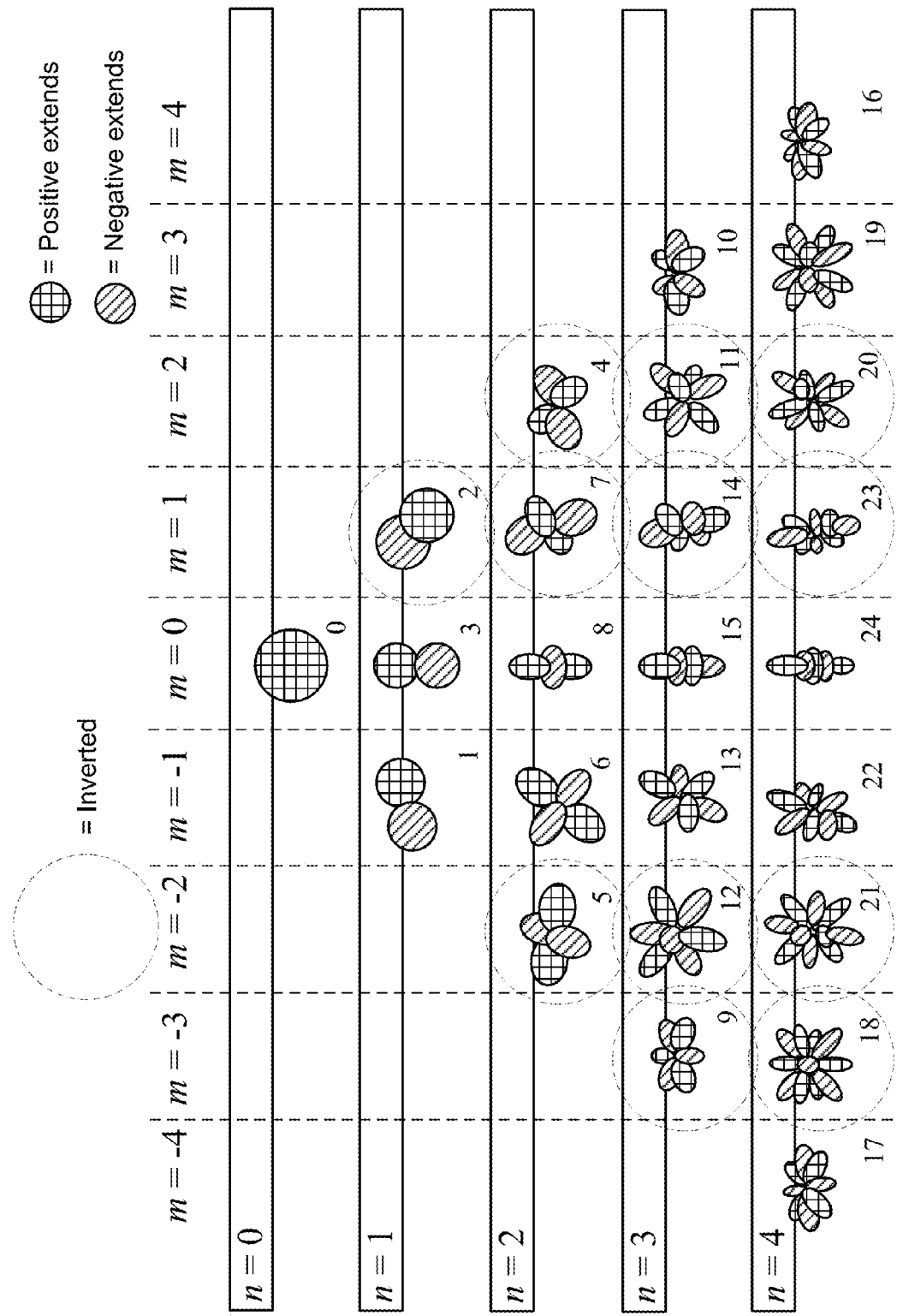

FIG. 16 is a diagram illustrating the result of applying the foregoing process 1080 to the spherical basis functions shown in the example of FIG. 1. In the example of FIG. 16, the orders of spherical basis functions are shown in each row, while the sub-orders are shown in each column. The numeral below each basis function may denote the assigned index to the spherical basis function. The spherical basis functions shown in FIGS. 1 and 16 differ in a number of different ways, due to the swapping and inverting operations.

For example, for the first order (n=1), the basis function associated with index 1 is swapped with the basis function associated with index 2. The basis function associated with index 2 is inverted while the basis function associated with index 1 is not inverted (e.g., flipper_val[sh]=SIGN_PAIR*(sh+1) and flipper_val[sh+1]=(SIGN_PAIR*−1)*sh). As another example, the basis functions associated with indexes 4 and 5 have been inverted, where lobes that used to be denoted as positive extends are now denoted as negative extends and lobes that used to be denoted as negative extends are now denoted as positive extends. As yet another example, the basis functions associated with indexes 6 and 7 are swapped, but only the basis function associated with index 7 is inverted.

As further examples, basis function associated with indexes 9 and 10 are swapped. The basis function associated with index 9 has been inverted but the basis function associated with an index of 10 has not be inverted per the step 1110 of the process 1080 (e.g., flipper_val[sh]=SIGN_PAIR*(sh+1) and flipper_val[sh+1]=(SIGN_PAIR*−1)*sh). The basis functions associated with indexes 11 and 12 have been inverted but not swapped. The basis functions associated with indexes 13 and 14 have been swapped and only the basis function associated with index 14 has been inverted. The process may continue for order 4, where the swapping and inverting may occur as noted above for the second order (e.g., basis functions associated with indexes 4-8).

Again, the audio editing system 18 may render the higher order ambisonic coefficients using the manipulated SH basis functions to a plurality of speaker feeds similar to that described above with respect to the audio playback device 16 for purposes of auditioning the edited audio data. The audio editing system 18 may drive a plurality of speakers using the plurality of speaker feeds such that the location of the audio object appears to originate 90 degrees to the right or the left from which the audio object appears using the SH basis functions prior to being manipulated.

Figure 7:
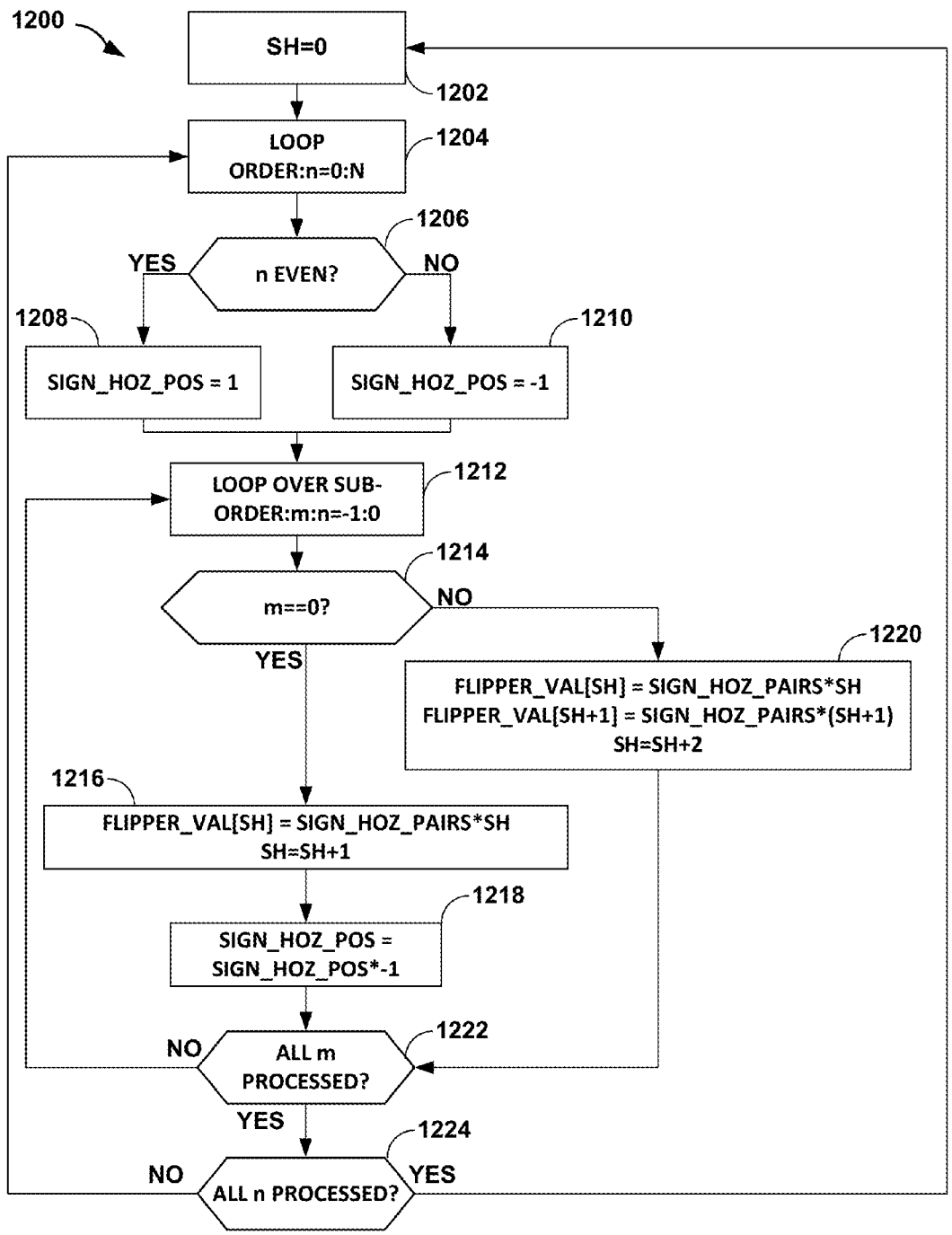
FIG. 7 is a flowchart illustrating an example process by which the audio editing system may generate or simulate a 3D delay for audio objects at a source location of 180 degrees.

FIG. 7 is a flowchart illustrating an example process 1200 by which the audio editing system 18 may generate or simulate a 3D delay for audio objects at a source location of 180 degrees. The audio editing system 18 may perform the process 1200 according to the following pseudocode:

---

Begin [Process coefficients of elements positioned at 180 degrees]
Initialize counter value 'sh' to 0
Define loop order of order 'n' as ranging from 0 to predefined ceiling 'N'
If current order 'n' is even
    {initialize sign of hoz_ pos = 1 }
Else
    {initialize sign of hoz_pos = −1}
Loop over coefficients of current order n, by moving from order 0 to n etc.
/*See FIG. 13 for looping operations */
If coefficient m == 0
    { set sign of non-pairs = −1 }
Else
    { sign of non-pairs = 1 }
Loop over sub-orders of current order n, by moving from sub-order m to 0, where m equals the current value of n, /*See FIG. 13 for looping operations */
If coefficient m == 0
    { set flipper_val [sh] for 180 degree scenario to the sign of the hoz_pos * [sh];
        Increment sh by 1}
Else
{ set flipper_val [sh] for 180 degree scenario to the sign of the hoz_pos * [sh];
 set flipper_val [sh] for 180 degree scenario to the sign of the hoz_pos * [sh+1];
        Increment sh by 2}
invert sign of hoz_pos;
If all coefficients of current order n processed
{If all orders processed
    { process 1090 done }
Else
    {continue to loop over available positive sub-orders m}
}
Else
    {continue to loop over coefficients of current order n}

---

The foregoing pseudocode may generally enable the audio editing system 18 to rotate an audio object by 180 degrees. According to the pseudocode, the audio editing system 18 may initialize the variable 'sh' to zero (1202). Next, the audio editing system 18 may loop over the orders of the spherical basis function, instantiating a variable 'n' with a value of zero and iterating from zero to the maximum order denoted by the variable 'N,' which may change depending on the resolution of the HOA representation (1204).

The audio editing system 18 may next determine whether the current value of the variable 'n' is an even number (1206). When the value of the variable 'n' is an even number ("YES" 1206), the audio editing system 18 may set the value of a variable "SIGN_HOZ_POS" to be equal to one (1208). When the value of the variable 'n' is not an even number ("NO" 1206), the audio editing system 18 may set the value of a variable "SIGN_HOZ_POS" to be equal to negative one (1210). The variable SIGN_HOZ_POS may denote whether or not the sub-order pairs are to be inverted.

After setting the value of the SIGN_HOZ_POS variable, the audio editing system 18 may loop over the sub-order 'm', instantiating a variable 'm', setting m equal to the current value of n, looping and decrementing by one until m equals zero (1212). Through each loop, the audio editing system 18 may determine whether the variable 'm' equals zero (1214). When the variable 'm' has a value of zero ("YES" 1102), the audio editing system 18 may set the flipper_val[sh] to the same value currently stored to the sh location in the flipper_val array because the zero sub-order basis functions remain unchanged for rotation by 180 degrees. However, the audio editing system 18 may invert the value of sh by multiplying by SIGN_HOZ_PAIRS (i.e., when n is not even and the SIGN_HOZ_PAIRS equals negative one in the example of FIG. 7). The audio editing system 18 may also increment the sh value by one (i.e., sh=sh+1 in the example of FIG. 7) (1216). The audio editing system 18 may also invert the sign of the value of the SIGN_HOZ_POS variable by multiplying the current value by negative one (1218).

When the value of the variable 'm' does not equal zero ("NO" 1214), the audio editing system 18 may determine perform the following operations (1220):

flipper_val[sh]=SIGN_HOZ_POS*sh;

flipper_val[sh+1]=SIGN_HOZ_POS*(sh+1);

SH=SH+2

In other words, the audio editing system 18 may invert the non-swapped pairs (e.g., sh and sh+1 as the pairs are sequential in the symmetrical ordering format) depending on the value of SIGN_HOZ_POS. The audio editing system 18 may also increment SH by two (effectively transitioning SH to identify the first spherical basis function in the next pair either associated with the current order in the next order).

Once any of the foregoing operations are complete (e.g., those operations performed when m==0, or when m does not equal zero), the audio editing system 18 may determine whether the audio editing system 18 has processed all of the positive sub-orders of the n-ordered spherical basis functions (1222). If positive sub-orders of the n-ordered spherical basis function remain unprocessed ("NO" 1222), the audio editing system 18 may continue to loop over the sub-orders of the current order n spherical basis functions (1212-1222). When all of the sub-orders of the current order n spherical basis functions have been processed ("YES" 1222), the audio editing system 18 may determine whether all of the orders (n ranging from 0 to the maximum order N) of the spherical basis functions have been processed (1224). When all of the orders of the spherical basis functions have been processed ("YES" 1224), the audio editing system 18 may perform adjustments for new spherical basis functions when the zero rotation process is again invoked.

Figure 17:
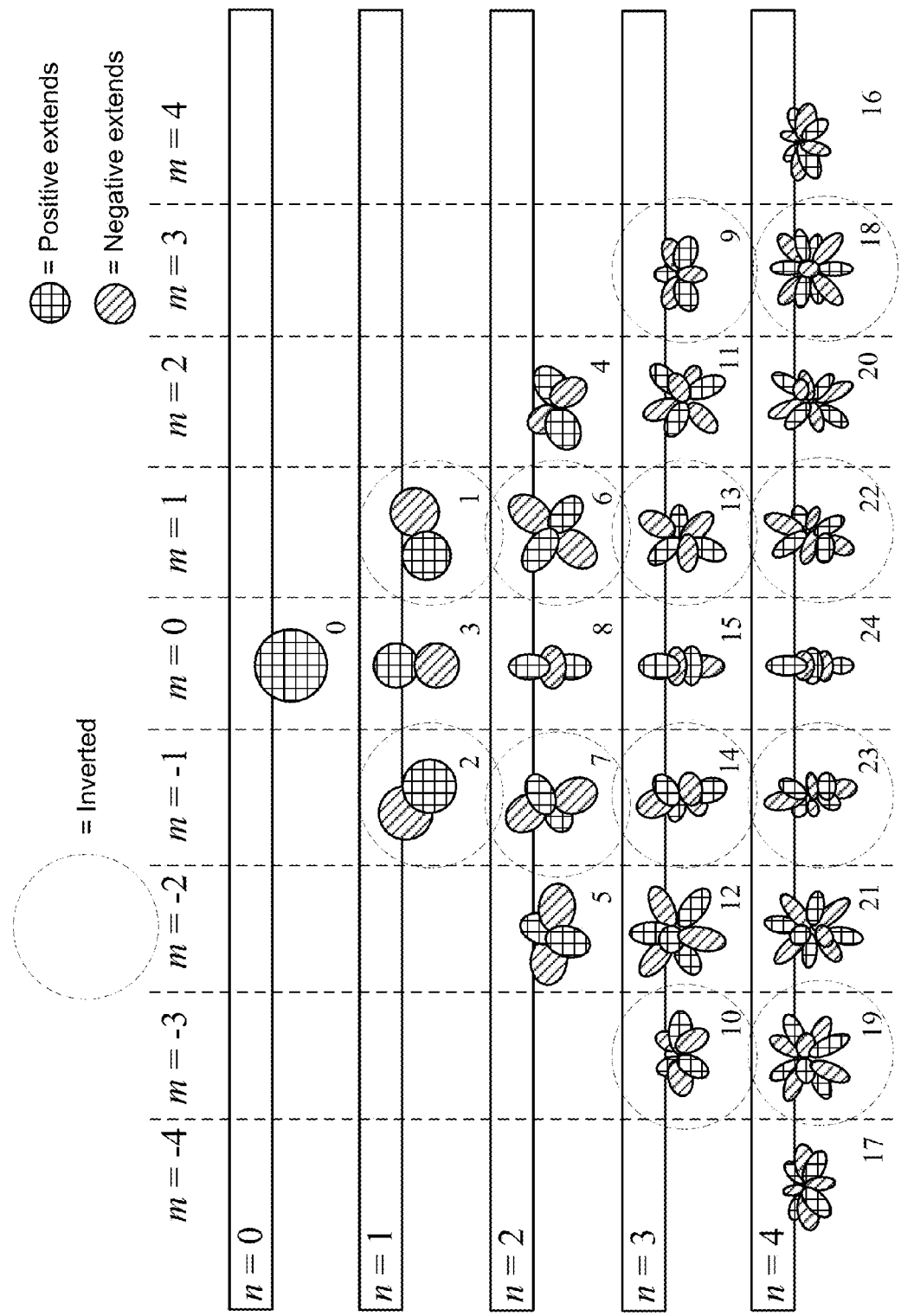

FIG. 17 is a diagram illustrating the result of applying the foregoing process 1200 to the spherical basis functions shown in the example of FIG. 1. In the example of FIG. 17, the orders of spherical basis functions are shown in each row, while the sub-orders are shown in each column. The numeral below each basis function may denote the assigned index to the spherical basis function. The spherical basis functions shown in FIGS. 1 and 17 differ in a number of different ways, due to the inverting operations.

For example, for the first order (n=1), the basis function associated with indexes 1 and 2 are inverted, where lobes that used to be denoted as positive extends are now denoted as negative extends and lobes that used to be denoted as negative extends are now denoted as positive extends. As another example, the spherical basis functions (which may also be referred to as "basis functions") associated with indexes 6 and 7 have been inverted as well as the basis functions associated with indexes 10, 14, 13, 9, 19, 23, 22 and 18. The audio editing system 18 may not swap any of the basis function sub-order pairs as a rotation of 180 degrees merely mirrors the audio object around a vertical plane bisecting a sphere.

As noted above, the audio editing system 18 may render the higher order ambisonic coefficients using the manipulated SH basis functions to a plurality of speaker feeds similar to that described above with respect to the audio playback device 16 for purposes of auditioning the edited audio data. The audio editing system 18 may drive a plurality of speakers using the plurality of speaker feeds such that the location of the audio object appears to originate 180 degrees to the right or the left from which the audio object appears using the SH basis functions prior to being manipulated.

Figure 8:
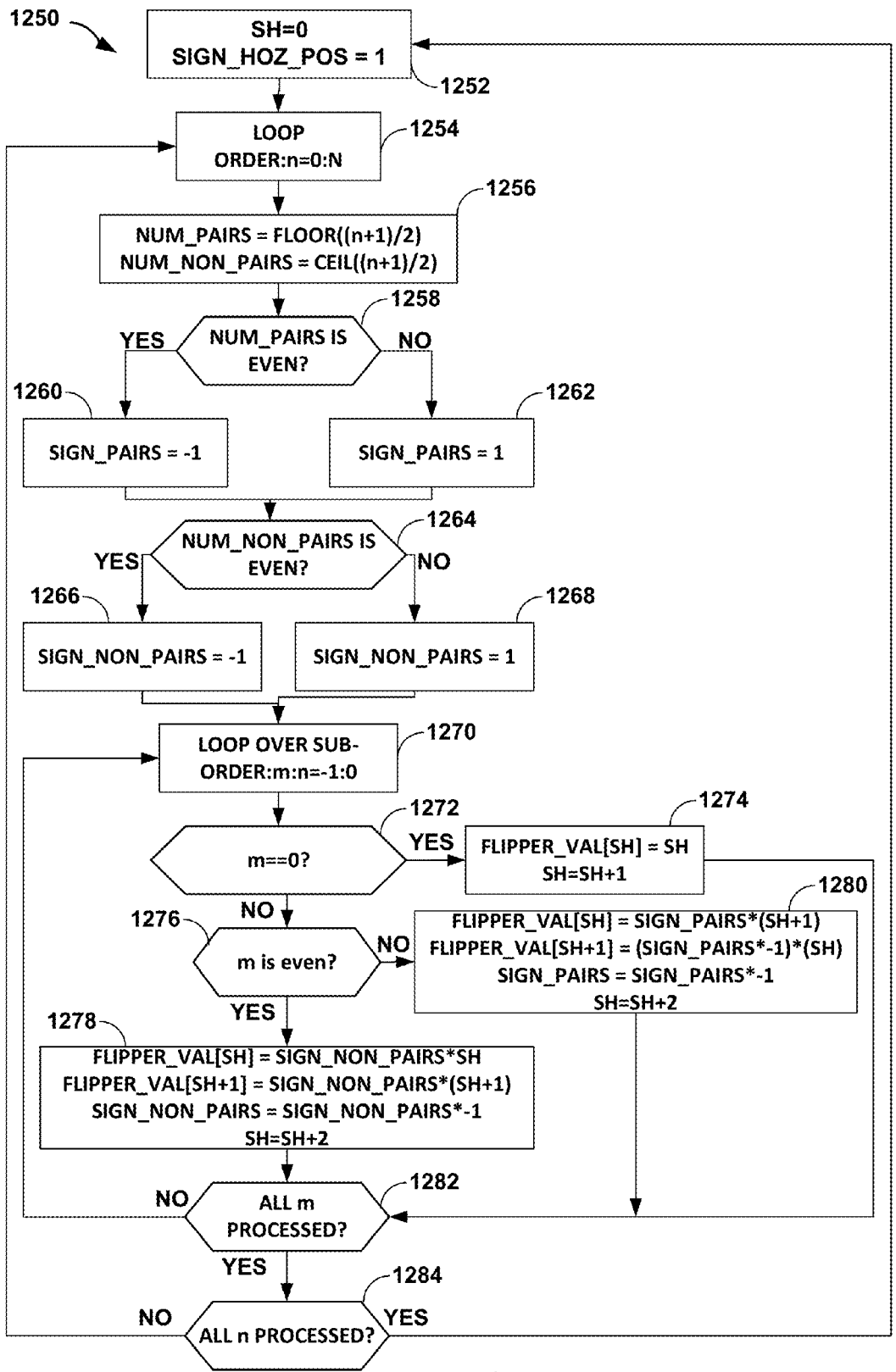
FIG. 8 is a flowchart illustrating an example process by which the audio editing system may generate or simulate a 3D delay for audio objects at a source location of 270 degrees.

FIG. 8 is a flowchart illustrating an example process 1250 by which the audio editing system 18 may generate or simulate a 3D delay for audio objects at a source location of 270 degrees. The audio editing system 18 may first initialize the variable 'sh' to zero and a variable SIGN_HOZ_POS to a value of one (1252). Next, the audio editing system 18 may loop over the orders of the spherical basis function, instantiating a variable 'n' with a value of zero and iterating from zero to the maximum order denoted by the variable 'N,' which may change depending on the resolution of the HOA representation (1254).

The audio editing system 18 may next determine a number of pairs ("NUM_PAIRS") and a number of non-pairs ("NUM_NON_PAIRS") for the current order 'n'. The number of pairs may denote the number of pairs that are to be swapped to perform the 270 rotation (where the term "swapped" may refer to swapping of the index for one of the pair with the index of the other one of the pair in the flipper_val array). The number of non-pairs may refer to a number of the pairs that are not swapped, including the zero sub-order spherical basis functions.

To obtain the number of pairs, the audio editing system 18 may compute the number of pairs and the number of non-pairs in accordance with the following equations (1256):

NUM_PAIRS=FLOOR((*n*+1)/2); and

NUM_NON_PAIRS=CEIL((*n*+1)/2).

As noted above, the FLOOR( ) function in the equations above may round down the result of (n+1)/2 to the nearest integer. The CEIL( ) function in the equations above may round up the result of (n+1)/2 to the nearest integer.

The audio editing system 18 may next determine whether the value of NUM_PAIRS is even (1258). When the value of NUM_PAIRS is even ("YES" 1260), the audio editing system 18 initializes a variable SIGN_PAIRS to negative one (1262). The SIGN_PAIRS variable may, as noted above, indicate whether to perform an inversion where the negative extends become the positive extends and the positive extends becomes the negative extends. When set to negative one, the SIGN_PAIRS variable indicates that the inversion is performed. When the value of NUM_PAIRS is not even ("NO" 1258), the audio editing system 18 initializes the variable SIGN_PAIRS to a value of one (1262), which indicates that the inversion is not performed.

The audio editing system 18 may next determine whether the NUM_NON_PAIRS is even (1264). When the value of NUM_NON_PAIRS is even ("YES" 1264), the audio editing system 18 initializes a variable SIGN_NON_PAIRS to negative one (1266). The SIGN_NON_PAIRS variable may indicate whether to perform an inversion with respect to the actual non-swapped pairs (excluding the zero sub-order "pair" which is not really a sub-order pair) where the negative extends become the positive extends and the positive extends becomes the negative extends. When set to negative one, the SIGN_NON_PAIRS variable indicates that the inversion is performed. When the value of NUM_NON_PAIRS is not even ("NO" 1264), the audio editing system 18 initializes a variable SIGN_NON_PAIRS to a value of one (1268), which indicates that the inversion is not performed.

After initializing the SIGN_PAIRS and the SIGN_NON_PAIRS for the current order, the audio editing system 18 may loop over the sub-order 'm', instantiating a variable 'm', setting m equal to the current value of n, looping and decrementing by one until m equals zero (1270). Through each loop, the audio editing system 18 may determine whether the variable 'm' equals zero (1272). When the variable 'm' has a value of zero ("YES" 1272), the audio editing system 18 may set the flipper_val[sh] to the same value currently stored to the sh location in the flipper_val array because the zero sub-order basis functions remain unchanged for rotation by 270 degrees. The audio editing system 18 may also increment the sh value by one (i.e., sh=sh+1 in the example of FIG. 8) (1274). When the value of the variable 'm' does not equal zero ("NO" 1272), the audio editing system 18 may determine whether the value of the variable 'm' is even (1276).

When the value of the variable 'm' is even ("YES" 1276), the audio editing system 18 performs the following operations (1278):

flipper_val[sh]=SIGN_NON_PAIRS*sh;

flipper_val[sh+1]=SIGN_NON_PAIRS*(sh+1);

SIGN_NON_PAIRS=SIGN_NON_PAIRS*-1; and

SH=SH+2

In other words, the audio editing system 18 may invert the non-swapped pairs (e.g., SH and SH+1 as the pairs are sequential in the symmetrical ordering format) depending on the value of SIGN_NON_PAIRS. The audio editing system 18 may also change the sign of the value of SIGN_NON_PAIRS to the opposite (e.g., 1 to −1 or −1 to 1), and increment SH by two (effectively transitioning SH to identify the first spherical basis function in the next pair either associated with the current order in the next order).

When the value of the variable 'm' is not even ("NO" 1280), the audio editing system 18 performs the following operations (1280):

flipper_val[sh]=SIGN_PAIRS*(SH+1);

flipper_val[sh+1]=(SIGN_PAIRS*-1)*(SH);

SIGN_PAIRS=SIGN_PAIRS*-1; and

SH=SH+2

In other words, the audio editing system 18 may swap the pairs (e.g., SH and SH+1 as the pairs, as noted above, are sequential in the symmetrical ordering format and given that the flipper_val indexed to sh is replaced with a value of sh+1). The audio editing system 18 may also potentially invert the swapped pairs depending on the value of SIGN_PAIRS. The audio editing system 18 may further change the sign of the value of SIGN_PAIRS to the opposite (e.g., 1 to −1 or −1 to 1), and increment SH by two (effectively transitioning SH to identify the first spherical basis function in the next pair either associated with the current order in the next order).

Once any of the foregoing operations are complete (e.g., those operations performed when m==0, or when m is either even or odd), the audio editing system 18 may determine whether the audio editing system 18 has processed all of the positive sub-orders of the n-ordered spherical basis functions (1282). If positive sub-orders of the n-ordered spherical basis function remain unprocessed ("NO" 1282), the audio editing system 18 may continue to loop over the sub-orders of the current order n spherical basis functions (1270-1282). When all of the sub-orders of the current order n spherical basis functions have been processed ("YES" 1282), the audio editing system 18 may determine whether all of the orders (n ranging from 0 to the maximum order N) of the spherical basis functions have been processed (1284). When all of the orders of the spherical basis functions have been processed ("YES" 1284), the audio editing system 18 may perform adjustments for new spherical basis functions when the zero rotation process is again invoked.

Figure 18:
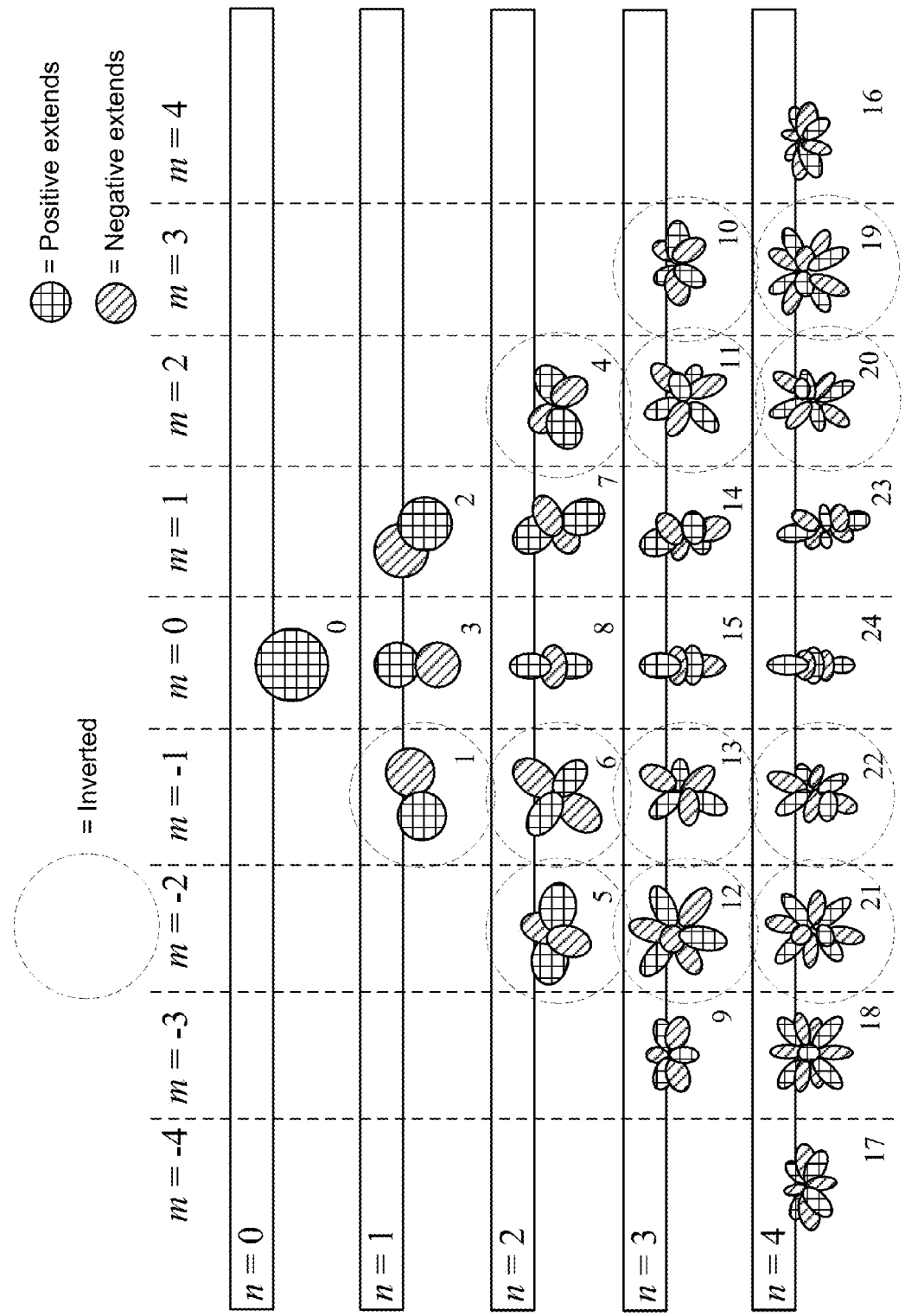

FIG. 18 is a diagram illustrating the result of applying the foregoing process 1250 to the spherical basis functions shown in the example of FIG. 1. In the example of FIG. 18, the orders of spherical basis functions are shown in each row, while the sub-orders are shown in each column. The numeral below each basis function may denote the assigned index to the spherical basis function. The spherical basis functions shown in FIGS. 1 and 18 differ in a number of different ways, due to the swapping inverting operations. Specifically, the same swapping is performed as that described above with respect to the 90 degree rotation shown in the example diagram of FIG. 16. The difference between the 90 degree rotation described with respect to FIG. 16 and the 270 degree rotation described with respect to FIG. 18 is that the inversion of the basis functions differs. Rather than invert basis functions associated with indexes 2, 5, 7, 4, 9, 12, 14, 11, 18, 21, 23 and 20, the audio editing system 18 inverts the basis functions associated with indexes 1, 5, 6, 4, 12, 13, 11, 10, 21, 22, 20 and 19.

Furthermore, the audio editing system 18 may render the higher order ambisonic coefficients using the manipulated SH basis functions to a plurality of speaker feeds similar to that described above with respect to the audio playback device 16 for purposes of auditioning the edited audio data. The audio editing system 18 may drive a plurality of speakers using the plurality of speaker feeds such that the location of the audio object appears to originate 270 degrees to the right or the left from which the audio object appears using the SH basis functions prior to being manipulated.

Figure 9:
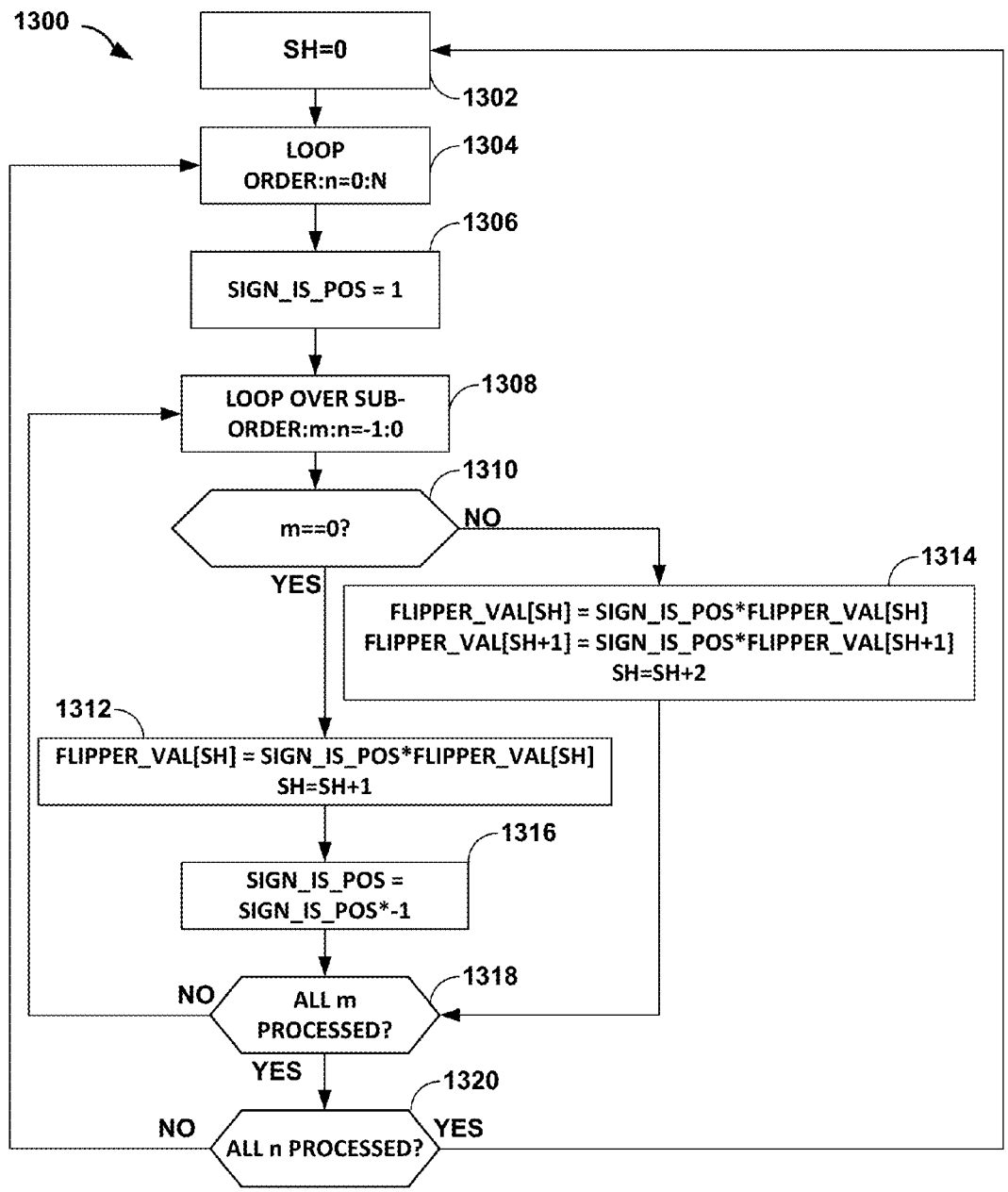
FIG. 9 is a flowchart illustrating an example process by which the audio editing system may perform a horizontal flipping of directional information of an audio object in accordance with the techniques of this disclosure.

FIG. 9 is a flowchart illustrating an example process 1300 by which the audio editing system 18 may perform a horizontal flipping of directional information of an audio object in accordance with the techniques of this disclosure. The audio editing system 18 may first initialize a variable sh to a value of zero (1302). The audio editing system 18 may then instantiate a variable 'n' and loop through the orders of the spherical basis functions from zero to N, where N again denotes the maximum order for the HOA representation of the soundfield (and is assumed to be four in this example) (1304).

For each iteration of the loop from zero to N, the audio editing system 18 set a value of the variable SIGN_IS_POS to one (1306). After setting the value of the variable SIGN_IS_POS, the audio editing system 18 loops through the positive sub-orders by setting a value of the variable 'm' to the current value of the variable 'n' and iterating from the current value of the variable 'n' to zero (by decrementing by −1 after each iteration) (1308). The audio editing system 18 may determine whether the value of the variable 'm' equals zero (where the double equals sign denotes a Boolean equal operation) (1310).

When the variable 'm' equals zero ("YES" 1310), the audio editing system 18 may perform the following operations (1312):

flipper_val[sh]=SIGN_IS_POS*flipper_val[sh]; and sh=sh+1.

In other words, the audio editing system 18 may invert the basis function associated with the index of the value of variable 'sh' depending on the value of the SIGN_IS_POS variable value. The audio editing system 18 may also increment the value of sh by one, while also inverting the sign of the SIGN_IS_POS variable value (1316).

When the variable 'm' does not equal zero ("NO" 1310), the audio editing system 18 may perform the following operations (1314):

flipper_val[sh]=SIGN_IS_POS*flipper_val[sh];

flipper_val[sh+1]=SIGN_IS_POS*flipper_val[sh+1]; and sh=sh+2.

The audio editing device 18 may, in other words, invert the sub-order pair of basis functions associated with the sh and sh+1 index depending on the value of the SIGN_IS_POS variable (inverting when SIGN_IS_POS equals negative one). The audio editing system 18 may also increment the value of the variable 'sh' by two.

Once any of the foregoing operations are complete (e.g., those operations performed when m==0 or when m does not equal zero), the audio editing system 18 may determine whether the audio editing system 18 has processed all of the positive sub-orders of the n-ordered spherical basis functions (1318). If positive sub-orders of the n-ordered spherical basis function remain unprocessed ("NO" 1318), the audio editing system 18 may continue to loop over the sub-orders of the current order n spherical basis functions (1308-1318). When all of the sub-orders of the current order n spherical basis functions have been processed ("YES" 1318), the audio editing system 18 may determine whether all of the orders (n ranging from 0 to the maximum order N) of the spherical basis functions have been processed (1320). When all of the orders of the spherical basis functions have been processed ("YES" 1320), the audio editing system 18 may perform adjustments for new spherical basis functions when the zero rotation process is again invoked.

Figure 19:
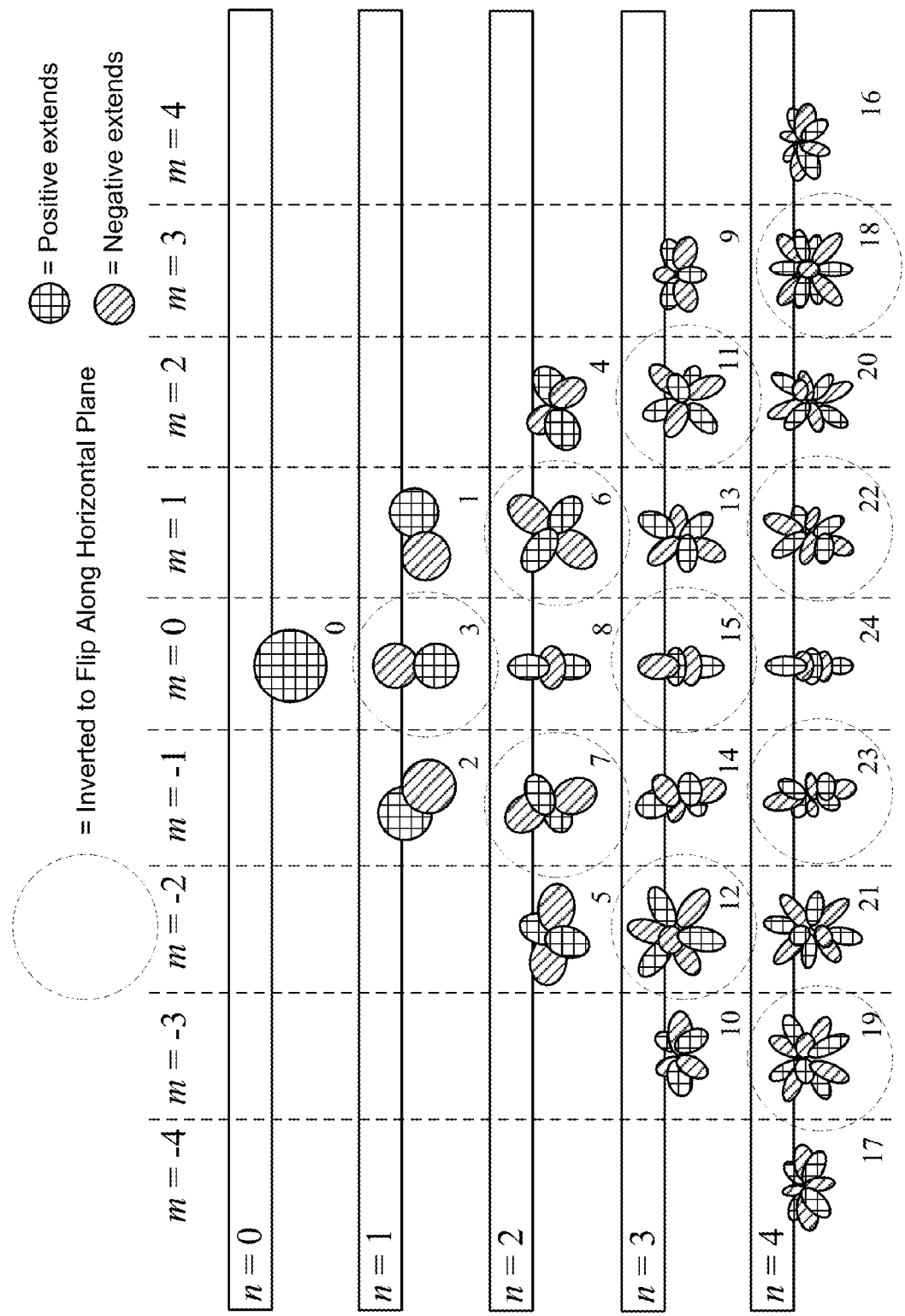

FIG. 19 is a diagram illustrating the result of applying the foregoing process 1300 to the spherical basis functions shown in the example of FIG. 1. In the example of FIG. 19, the orders of spherical basis functions are shown in each row, while the sub-orders are shown in each column. The numeral below each basis function may denote the assigned index to the spherical basis function. The spherical basis functions shown in FIGS. 1 and 19 differ in a number of different ways, due to the inverting operations. Specifically, the audio editing system 18 inverts the basis functions associated with indexes 3, 7, 6, 12, 15, 11, 19, 23, 22, and 18.

Although described with respect to the basis functions for the zero degree rotation, the audio editing system 18 may apply the process 1300 to any of the foregoing 90, 180 or 270 degree rotation basis functions shown in the example of FIGS. 16-18. When applied to the 90 degree rotation for example shown in FIG. 16, the audio editing system 18 may invert the basis functions denoted with numbers 3, 6, 7, 23, 25, 22, 28, 22, 23 and 19. When applied to the 180 degree rotation shown in the example of FIG. 17, the audio editing system 18 may invert the basis functions denoted with numbers 3, 7, 6, 12, 15, 11, 19, 23, 22, and 18. When applied to the 180 degree rotation shown in the example of FIG. 18, the audio editing system 18 may invert the basis functions associated with numbers 3, 6, 7, 12, 15, 11, 18, 22, 23 and 19. These numbers are not indexes into the arrays as various ones of the basis functions may have been swapped. As such, these numbers represent the respective original indexes in the flipper_val array at initialization (e.g., the zero degree rotation shown in the examples of FIGS. 1 and 15). This is discuss in more detail below with respect to the example of FIG. 20.

As noted above, the audio editing system 18 may render the higher order ambisonic coefficients using the manipulated SH basis functions to a plurality of speaker feeds similar to that described above with respect to the audio playback device 16 for purposes of auditioning the edited audio data. In this instance, the audio editing system 18 manipulates the basis functions by inverting the basis functions to project the audio object in space across a horizontal plane bisecting a sphere into two semi-spheres. The audio editing system 18 may drive a plurality of speakers using the plurality of speaker feeds such that the location of the audio object appears to originate from an opposite one of the semi-spheres at which the audio object appears using the SH basis functions prior to being manipulated.

Figure 20:
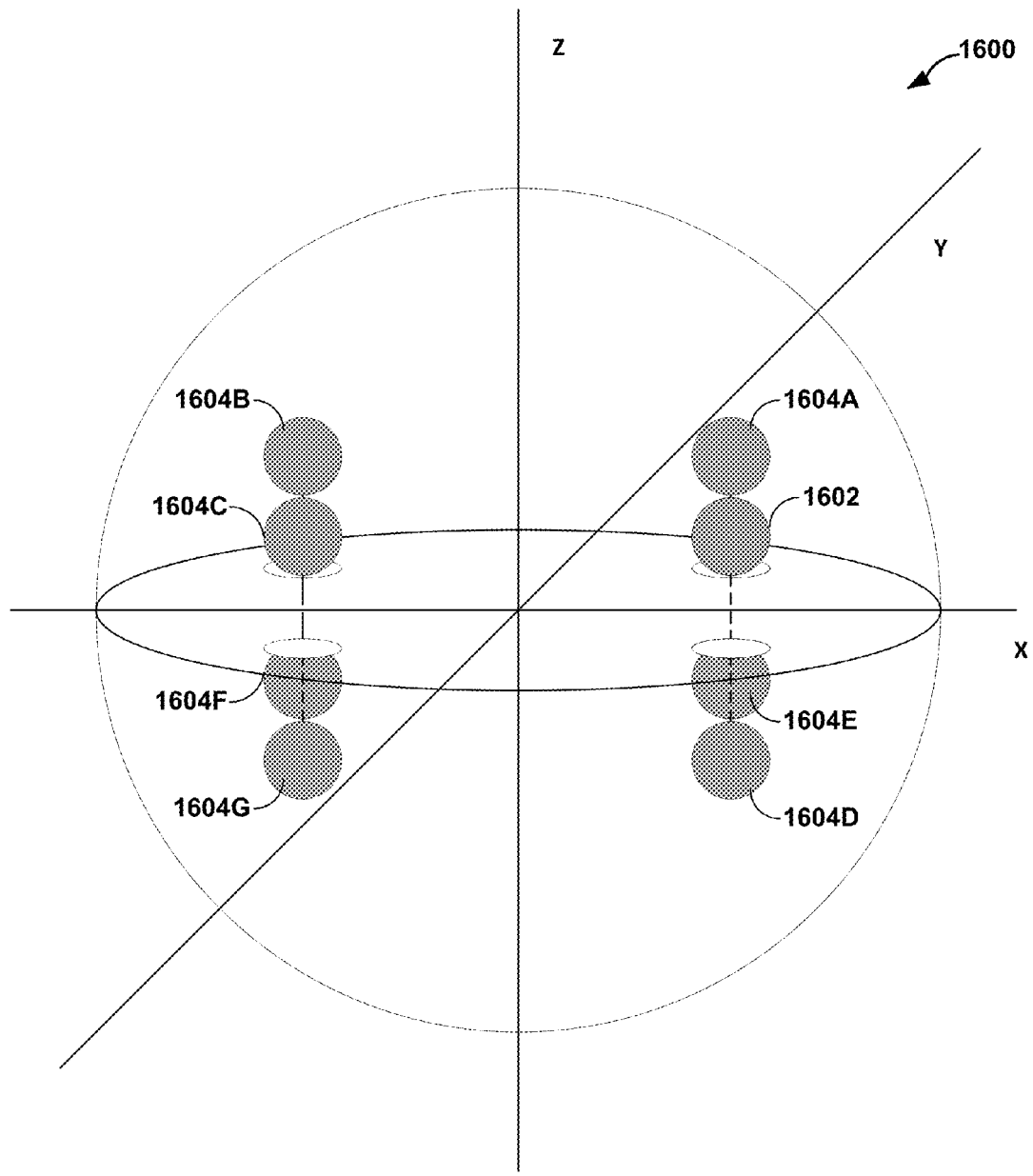
FIG. 20 is a diagram illustrating how manipulation of spherical basis functions may provide a form of octant mirroring to adjust the location of an audio object in accordance with the techniques described in this disclosure.

FIG. 20 is a diagram illustrating how manipulation of spherical basis functions may provide a form of octant mirroring to adjust the location of an audio object 1602 in accordance with the techniques described in this disclosure. In the example of FIG. 20, the audio editing system 18 may allow for the audio object 1602 located in what may be characterized as a first octant of the soundfield (where the octants refer to the 8 equal volumes that would result from dividing the top and bottom semi-spheres).

The audio editing system 18 may rotate the object 1602 90 degrees to the right to arrive at location 1604A. The audio editing system 18 may rotate the object 1602 180 degrees to the right to arrive at location 1604B. The audio editing system 18 may rotate the object 1602 270 degrees to the right to arrive at location 1604C (which is equivalent to rotation by 90 degrees to the left). The audio editing system 18 may rotate the object 1602 0 degrees to the right to arrive at same location the audio object 1602 is currently located.

The audio editing system 18 may also flip the audio object 1602 about the horizontal plane bisecting the soundfield 1600 and perform any of the foregoing 0, 90, 180 and 270 degree rotations. Using a combination of the foregoing processes (e.g., the horizontal flipping and any one of the rotations although the zero rotation may not be necessary), the audio editing system 18 may project the audio object 1602 to any of locations 1604D-1604G. The audio editing system 18 may therefore project the audio object 1602 into any of the 8 octants. When the audio object 1602 is located near or on the horizontal plane, only four locations are available as the horizontal flipping has little effect. These locations resemble how the audio object 1602 would be perceived by a listener upon rendering and playback by a 3D speaker configuration.

Figure 10:
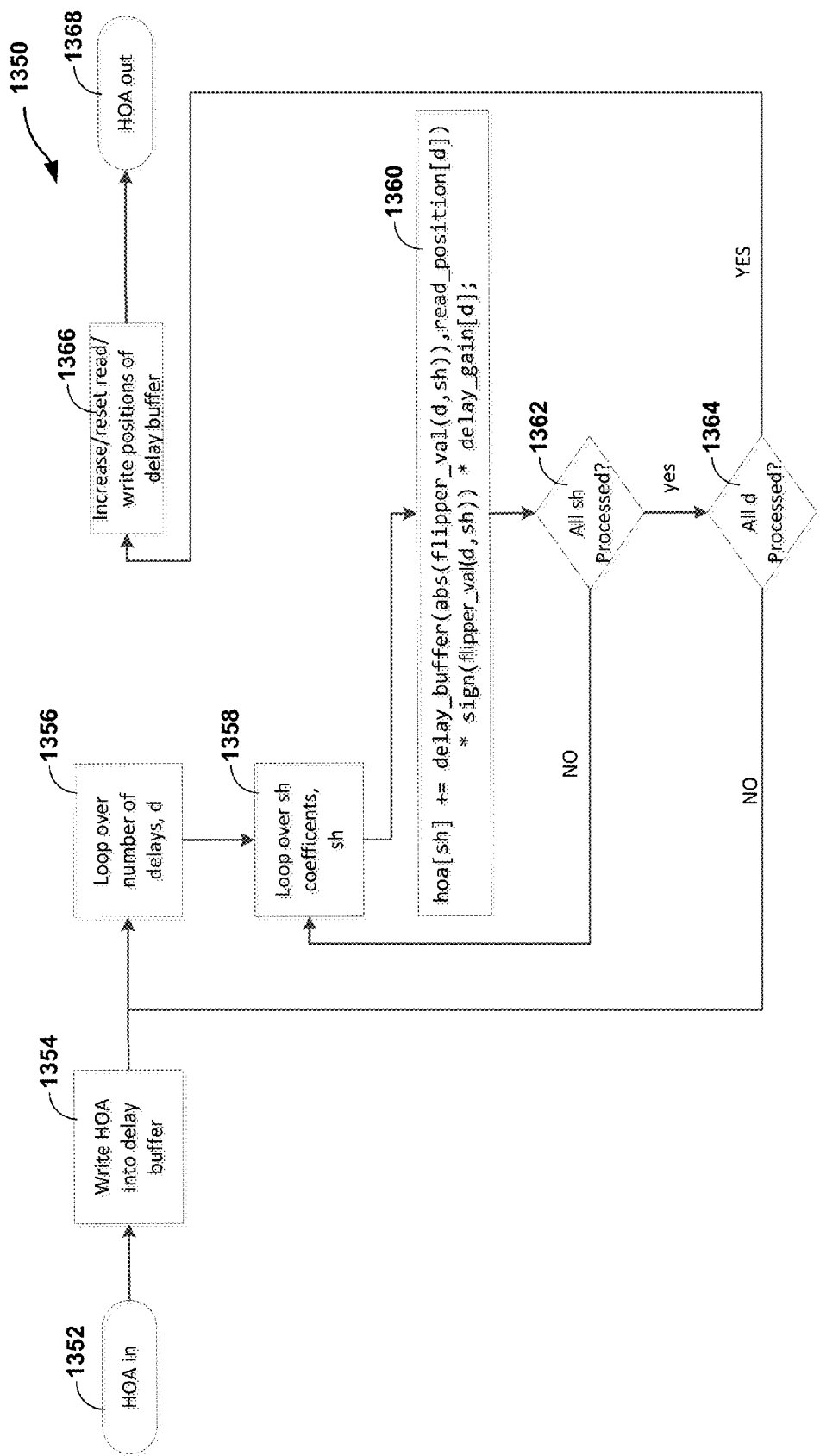
FIG. 10 is a flowchart illustrating an example process by which the audio editing system may perform one or more processing operations on an audio object.

FIG. 10 is a flowchart illustrating an example process 1350 by which the audio editing system 18 may perform one or more processing operations on an audio object. The audio editing system 18 may implement the process 1350 according to the following pseudocode:

```
Receive HOA;
Write HOA to delay buffer;
Loop over number of delays 'd';
Loop over spherical harmonic coefficients, indexed by variable 'sh';
hoa[sh]  +=   delay_buffer(abs(flipper_val(d,sh)),read_position[d])   *
sign(flipper_val(d,sh)) * delay_gain[d];
If all sh processed
     {If all d processed
          {increase/reset one or more read/write positions of delay buffer;
          Output HOA}
     Else
          {continue to loop over delays d}
     }
Else
     {continue to loop over sh}
```

That is, according to the foregoing pseudocode, the audio editing system 18 may receive an HOA representation of the soundfield (1352). The audio editing system 18 may write the HOA representation into a delay buffer (1354). After writing the HOA representation into the delay buffer, the audio editing system 18 may loop over the number of delays (or, in other words, delay numbers), which may be entered by an operator of the audio editing system 18 and may be stored as a value to the variable 'd' (1356). The audio editing system 18 may next loop over (or, in other words, iterate through) the spherical harmonic coefficients (which may alternatively be referred to as HOA coefficients) of the HOA representations, where the spherical harmonic coefficients may be indexed by the variable 'sh' (1358).

The audio editing system 18 may, in each loop, perform the following operation (1360):

hoa[sh]+=delay_buffer(abs(flipper_val(*d*,sh)),read_position[*d*])*sign(flipper_val(*d*,sh))*delay_gain[*d*].

The foregoing operation may invoke a delay buffer functions that takes as inputs two values. The first value is the absolute value (abs) of the flipper_val functions. The flipper_val function takes as inputs the delay, d, and the sh index. The flipper_val function may reuse the spherical basis function associated with the index 'sh' for the d number of delays. The second input to the delay_buffer functions is the result of the read_position[d], which represents the read position in the buffer at the current delay number d. The operation may further multiply the output of the delay_buffer function by the result of the sign function multiplied by the delay_gain array at the array location of the current value of the variable d. The sign function may have a single input of the flipper_val(d, sh) function described above.

The audio editing system 18 may then determine whether all of the sh were processed (where sh may iterate from zero to $(N+1)^2-1$) (1362). When all of the sh were not processed ("NO" 1362), the audio editing system 18 may continue to loop through the sh (1358-1362). When all of the sh have been processed ("YES" 1362), the audio editing system 18 may determine whether all of the delays, d, have been processed (1364). When all of the delays have not been processed ("NO" 1364), the audio editing system 18 may continue to iterate through the delays (1356-1364). When all of the delays have been processed ("YES" 1364), the audio editing system 18 may increase/reset the read/write positions of the delay buffer and output the HOA representation (1366 and 1368).

Figure 11:
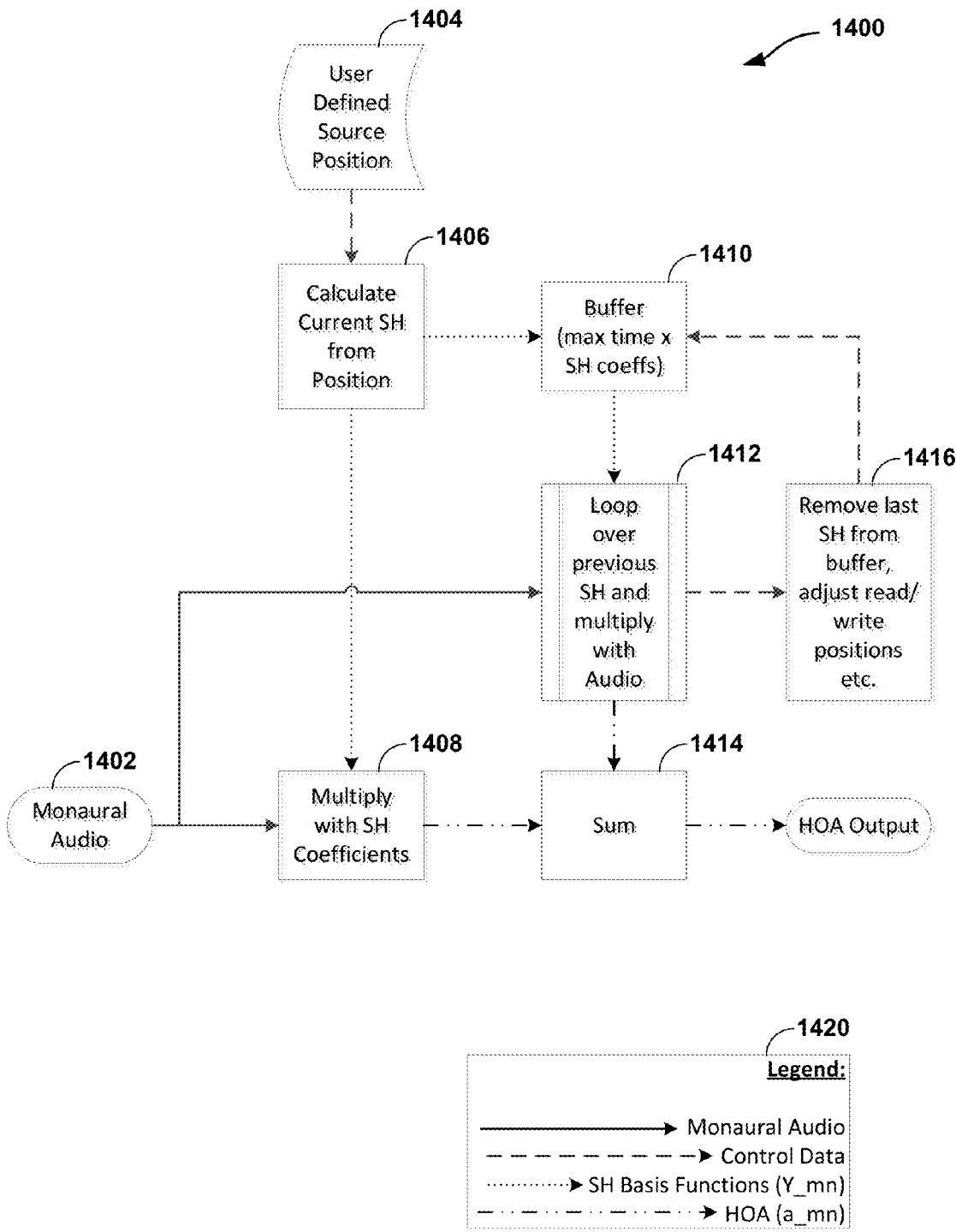
FIGS. 11 and 12 are flowcharts each illustrating an example process, processes and respectively, by which the audio editing system may add a "source tail" to one or more objects of a soundfield.
Figure 12:
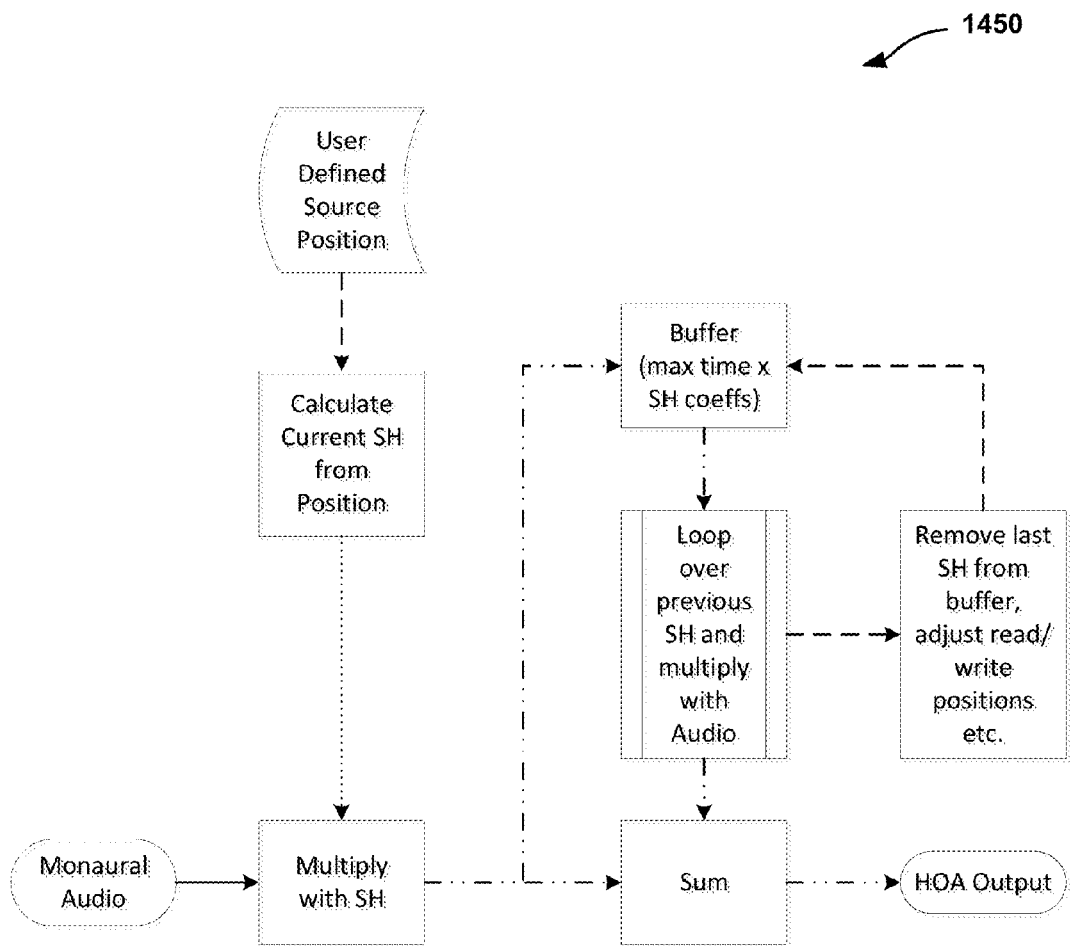
Figure 12:
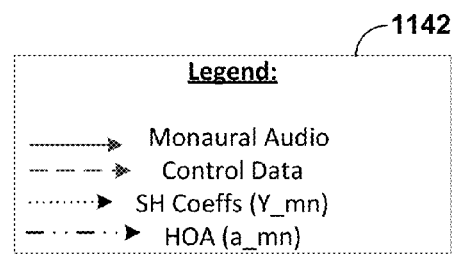

FIGS. 11 and 12 are flowcharts each illustrating an example process, processes 1400 and 1450 respectively, by which the audio editing system 18 may add a "source tail" to one or more objects of a soundfield. A "source tail" may refer to an audio effect where a sound source appears to be moving around the 3D space. The source tail may simulate movement (e.g., movement away) of the audio source. Movement of the audio object may be analogous to the gradual movement of a video object, such as the residual video data (or "tail") displayed in the movement of objects in video animation. In examples, calculating spherical harmonics for every source position of a source tail may be highly computational. Techniques of this disclosure are directed to more efficient ways by which to compute the source tail so as to introduce source tail-related capabilities to 3D audio technology.

To provide a source tail, techniques of this disclosure may create a delay line to hold previous data. According to certain audio plug-in technologies, the delay line may operate to buffer the incoming monaural audio, so that the incoming monaural audio may be processed at a different time point. In contrast, techniques described herein are directed to modifying the delay buffer concept, and instead include any one or both of two possible approaches. The first approach is to create a buffer of 'time in samples'×'number of SH coefficients' and store the previous Y(n,m), which may represent a notation for the basis functions, values. According to this first approach, the collection of buffered Ynm coefficients is then multiplied by the next audio sample along with a tail gain, and summed with the normal SH transformed version.

According to the second approach/version, the a(n,m) values of the SH transformed monaural signal are stored. The first approach may serve to stretch the current audio sample spatially, while the second approach may repeat the previous audio sample as though the previous audio sample is held in time and space. The buffer size in terms of time samples is maintained at the maximum user-definable size. In turn, the current and maximum read positions are altered within the buffer so as to not be constantly removing from the front and adding to the back (this may also be possible with STL container types).

As a stationary audio source, the current and max read positions may be identical. As the source begins to move, the max read position may increase, by sample, until the desired offset (current set delay time) is reached. Conversely, as the source comes to a stop, the max_read position may go from the current set time in samples, and move towards the current position. Equally only the necessary gains of the source tail may be applied (e.g., by the audio editing system 18) to the delayed SH transform. FIG. 11 is a flowchart illustrating the first process 1400, while FIG. 12 is a flowchart illustrating the second process 1450.

According to process 1400 shown in the example of FIG. 11, the audio editing system 18 may receive monaural audio (1402). The audio editing system 18 may also receive a user defined source position for the monaural audio (1404). The audio editing system 18 may next calculate the spherical harmonic basis functions to project the monaural audio to the user defined source position (1406). The audio editing system 18 may next multiply the monaural audio with the spherical harmonic basis functions to obtain the HOA representation of the monaural audio (1408).

The audio editing system 18 may store the basis functions to a buffer (1410). The audio editing system 18 may loop over the previous SH and multiply with the monaural audio, which may then be summed with the HOA representation of the monaural audio (1412 and 1414). The result of the summation is an HOA representation of the monaural audio with the source tail effect. After looping over the previous basis functions, the audio editing system 18 may remove the last spherical harmonic basis functions from the buffer and adjust read/write positions (1416).

In other words, the audio editing system 18 may loop over the audio objects of the input audio data, and apply the buffered basis function to subsequent audio objects, to generate the audio source tail. The audio editing system may leverage data on the past location of the audio source (e.g., "where it was") and thus may eliminate the need to recalculate the basis function for subsequent frames. The audio editing system 18 may apply the process 1130 to generate the source tail at the encoding stage.

In this respect, the audio editing system 18 may be configured to add a source tail to audio objects to simulate movement of the source of the audio data. In some examples, the movement of the audio object may be analogous to the gradual movement of a video object, such as the residual video data (or "tail") displayed in the movement of objects in video animation. As described in the legend 1420 of FIG. 11, the solid lines are associated with monaural audio, the dashed lines are associated with control data, the dotted lines are associated with SH coefficients (Y_mn), and the dashed & dotted lines are associated with HOA (a_min).

The process 1450 shown in FIG. 12 is similar to the process 1400 shown in FIG. 11 except that the basis functions are first multiplied with the monaural audio and the HOA representation of the monaural audio object is buffered instead of the basis functions themselves.

FIG. 13 is a diagram illustrating a looping process as described above with respect to FIGS. 5-10. The looping process follows the grey arrows, beginning with the grey arrow 1500 and the ending with grey arrow 1526 for a fourth order HOA representation.

Figure 14:
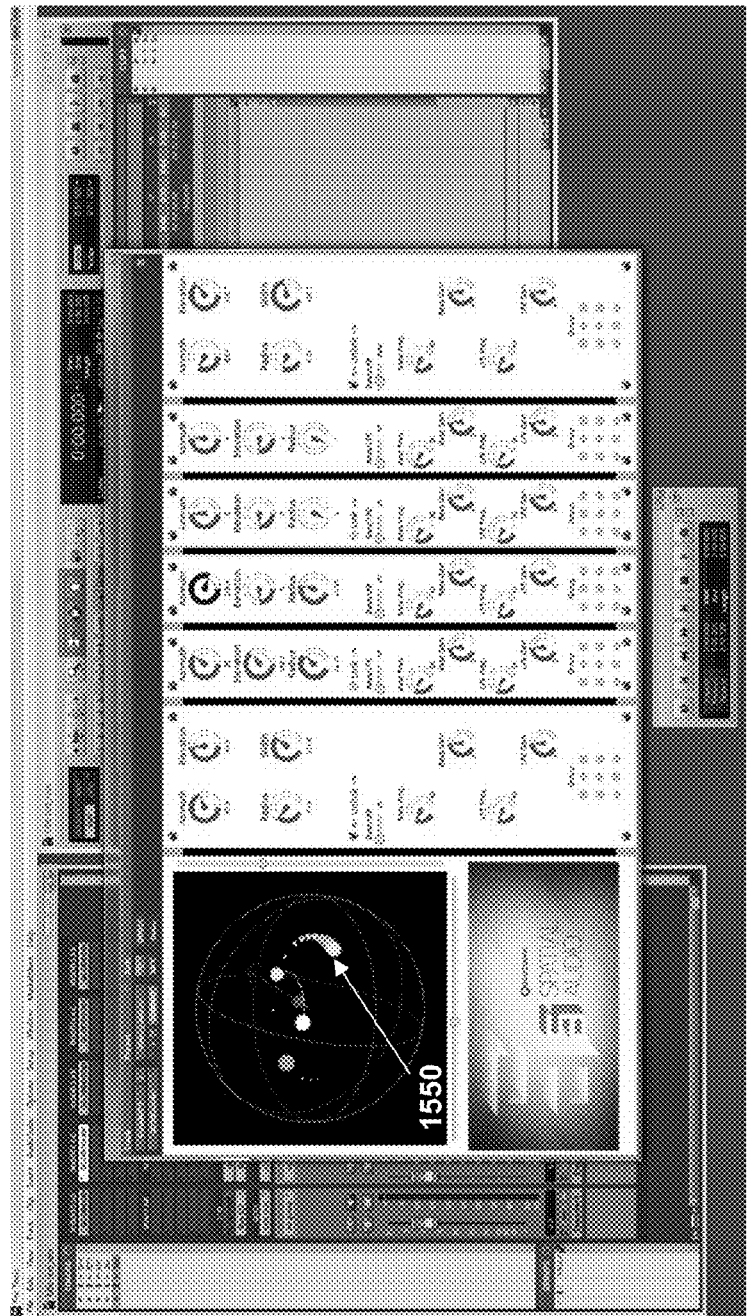
FIG. 14 illustrates a graphical user interface (GUI) via which a user may specify a source tail, as implemented in the process of FIG. 11 or the process of FIG. 12.

FIG. 14 illustrates a graphical user interface (GUI) via which a user may specify a source tail, as implemented in the process of FIG. 11 or the process 1450 of FIG. 12. For example, the width of the "tail" GUI element 1500 may specify the gain with respect to the source tail added to the audio data by the audio editing system 18. The audio editing system may store (or "buffer) a basis function based on an audio frame that correlates to an initial portion of the tail GUI element 1500. In turn, the audio editing system 18 may apply the buffered basis function to one or more subsequent audio objects, to generate a delay or "source tail" associated with the movement of the tail GUI element 1500. In this manner, the audio editing system may reuse basis functions based on the user input associated with the tail GUI element 1500, thereby eliminating the need to recalculate basis functions for creating the source tail.

In other words, the audio editing system 18 may include a GUI module capable of depicting a representation of a soundfield in which the audio object resides and a representation 1550 of the audio object at a location within the soundfield the audio object resides. The operator of the audio editing system 18 may enter user input (e.g., via a mouse, keyboard, trackpad, touchscreen or any other input mechanisms) to manipulate the location of the audio object, enhance the audio object, or otherwise edit the audio object or the soundfield. In the example of FIG. 14, the user has manipulated the representation of the audio object to create the above noted source-tail effect. Moreover, the user in editing the representation 1550 of the audio object has defined a representation of the source-tail effect having a certain width or volume and a certain length. The width or volume may represent or otherwise be indicative of a gain applied to the audio object and subsequent audio objects. The length of the source-tail representation may represent or otherwise be indicative of the length of the delay applied to the audio object.

In this respect, the audio editing system 18 may provide a GUI capable of allowing a wide range of manipulations of representations of audio objects and the soundfield in general for HOA representations of audio objects. The user may apply a delay, for example, to create a source-tail effect such that upon rendering and playback of the audio data the audio object appears to trail off and move within the soundfield. The techniques may, in this manner, allow for the application of a delay to an audio object represented by one or more higher order ambisonics (HOA) coefficients based on a correlation with a user input. Moreover, the techniques may display a graphical user interface (GUI) that depicts a representation of a soundfield in which the audio object resides and a representation of the audio object at a location within the soundfield the audio object resides.

The audio editing system 18 may also operate in accordance with the techniques described in this disclosure by being configured to operate in accordance with the method set forth in the following clauses.

Clause 1a. A method comprising rendering, using an output buffer, output audio data that conforms to a speaker layout, from input audio data obtained from a shared buffer, the input data comprising representations of higher order ambisonics coefficients.

Clause 2a. The method of clause 1a, wherein the output audio data and the input audio data are associated with different numbers of channels.

Clause 3a. The method of either clauses 1a or 2a, or a combination thereof, wherein the shared buffer receives the input audio data from one or more input buffers.

Clause 4a. The method of any of clauses 1a-3a or any combination thereof, wherein the shared buffer comprises a circular buffer architecture.

In some examples, the audio editing device 18 may comprise a non-transitory computer-readable storage medium having stored thereon instruction that, when executed, cause one or more processors to perform the method recited by any combination of clauses 1a-4a.

In some examples, the audio editing device may comprise means for performing each of the steps of the method recited by any combination of clauses 1a-4a.

The audio editing system 18 may also operate in accordance with the techniques described in this disclosure by being configured to operate in accordance with the method set forth in the following clauses.

Clause 1b. A method comprising storing higher order ambisonics (HOA) coefficients, and applying a delay to an audio object represented by one or more higher order ambisonics (HOA) coefficients based on a correlation with a user input.

Clause 2b. The method of clause 1b, wherein the user input is associated with a movement of an element of a graphical user interface (GUI).

Clause 3b. The method of clause 2b, further comprising deriving one or more spherical harmonics (SH) basis functions from the movement the element.

Clause 4b. The method of clause 3b, further comprising storing the one or more derived SH basis functions to a buffer.

Clause 5b. The method of clause 4b, wherein the audio object is a first audio object, and wherein the one or more processors are further configured to apply the one or more stored SH basis functions to one or more subsequent audio objects of the audio data that follow the first audio object.

Clause 6b. The method of clause 1b, further comprising displaying a graphical user interface (GUI) that depicts a representation of a soundfield in which the audio object is positioned and a representation of the audio object at a location within the soundfield the audio object resides.

Clause 7b. The method of clause 1b, further comprising displaying a graphical user interface (GUI) that depicts a representation of a soundfield in which the audio object resides and a representation of the audio object, wherein the representation of the audio object is at a location within the soundfield at which the audio object resides, and receive the user input.

Clause 8b. The method of clause 1b, further comprising displaying a graphical user interface (GUI) that depicts a representation of a soundfield in which the audio object resides and a representation of the audio object at a location within the soundfield the audio object resides, and receiving the user input, wherein the GUI indicates the delay of the audio object via a graphical representation.

Clause 9b. The method of clause 8b, wherein a width or volume of the graphical representation is indicative of a gain applied to the audio object.

Clause 10b. The method of clause 8b, wherein the length of the graphical representation is indicative of a duration of the delay applied to the audio object.

Clause 11b. The method of clause 1b, wherein applying the delay comprises applying the delay to create a source-tail effect such that upon rendering and playback of the audio data the audio object appears to trail off and move within the soundfield.

In some examples, the audio editing device 18 may comprise a non-transitory computer-readable storage medium having stored thereon instruction that, when executed, cause one or more processors to perform the method recited by any combination of clauses 1b-11b.

In some examples, the audio editing device may comprise means for performing each of the steps of the method recited by any combination of clauses 1b-11b.

The audio editing system 18 may also operate in accordance with the techniques described in this disclosure by being configured to operate in accordance with the method set forth in the following clauses.

Clause 1c. A method of editing audio data, the method comprising applying a delay to audio objects represented by one or more higher order ambisonics (HOA) coefficients by storing the audio objects represented by the one or more ambient higher order ambisonics coefficients to a delay buffer.

Clause 2c. The method of clause 1c, further comprising determining a delay number, and iterating through one or more spherical harmonics (SH) basis functions, for a number of iterations equal to the delay number.

Clause 3c. The method of clause 2c, further comprising upon iterating through the one or more SH basis functions for the number of iterations equal to the delay number, determining whether all of the one or more SH basis functions have been processed.

Clause 4c. The method of clause 3c, further comprising, when all of the one or more SH basis functions have been processed, manipulating a read/write position of the delay buffer.

Clause 5c. The method of clause 4c, wherein manipulating the read/write position of the delay buffer comprises at least one of increasing the read/write position or resetting the read/write position.

In some examples, the audio editing device 18 may comprise a non-transitory computer-readable storage medium having stored thereon instruction that, when executed, cause one or more processors to perform the method recited by any combination of clauses 1c-5c.

In some examples, the audio editing device may comprise means for performing each of the steps of the method recited by any combination of clauses 1c-5c.

The audio editing system 18 may also operate in accordance with the techniques described in this disclosure by being configured to operate in accordance with the method set forth in the following clauses.

Clause 1d. A method of editing an audio object, the method comprising storing a higher order ambisonic (HOA) representation of the audio object, and adding a source tail to the HOA representation of the audio object by storing one or more spherical harmonic (SH) basis functions associated with the audio object to a buffer.

Clause 2d. The device of clause 1d, wherein the audio object is a first audio object, and wherein the method further comprising applying the one or more stored SH basis functions to one or more subsequent audio objects that follow the first audio object.

Clause 3d. The device of clause 2d, wherein applying the one or more stored SH basis function comprises applying the one or more stored SH basis functions to the one or more subsequent audio objects to associate the one or more subsequent audio objects with an audio source associated with the first audio object.

In some examples, the audio editing device 18 may comprise a non-transitory computer-readable storage medium having stored thereon instruction that, when executed, cause one or more processors to perform the method recited by any combination of clauses 1d-3d.

In some examples, the audio editing device may comprise means for performing each of the steps of the method recited by any combination of clauses 1d-3d.

The foregoing techniques may be performed with respect to any number of different contexts and audio ecosystems. A number of example contexts are described below, although the techniques should be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed comprises an audio ecosystem that may include broadcast recording audio objects, professional audio systems, consumer on-device capture, HOA audio format, on-device rendering, consumer audio, TV, and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.), such as audio playback system 16.

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a soundfield. For instance, the mobile device may acquire a soundfield via the wired and/or wireless acquisition devices and/or the on-device surround sound capture (e.g., a plurality of microphones integrated into the mobile device). The mobile device may then code the acquired soundfield into the HOA coefficients for playback by one or more of the playback elements. For instance, a user of the mobile device may record (acquire a soundfield of) a live event (e.g., a meeting, a conference, a play, a concert, etc.), and code the recording into HOA coefficients.

The mobile device may also utilize one or more of the playback elements to playback the HOA coded soundfield. For instance, the mobile device may decode the HOA coded soundfield and output a signal to one or more of the playback elements that causes the one or more of the playback elements to recreate the soundfield. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D soundfield and playback the same 3D soundfield at a later time. In some examples, the mobile device may acquire a 3D soundfield, encode the 3D soundfield into HOA, and transmit the encoded 3D soundfield to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of HOA signals. For instance, the one or more DAWs may include HOA plugins and/or tools which may be configured to operate with (e.g., work with) one or more game audio systems. In some examples, the game studios may output new stem formats that support HOA. In any case, the game studios may output coded audio content to the rendering engines which may render a soundfield for playback by the delivery systems.

The techniques may also be performed with respect to exemplary audio acquisition devices. For example, the techniques may be performed with respect to an Eigen microphone which may include a plurality of microphones that are collectively configured to record a 3D soundfield. In some examples, the plurality of microphones of Eigen microphone may be located on the surface of a substantially spherical ball with a radius of approximately 4 cm. In some examples, the audio encoding device 20 may be integrated into the Eigen microphone so as to output a bitstream 21 directly from the microphone.

Another exemplary audio acquisition context may include a production truck which may be configured to receive a signal from one or more microphones, such as one or more Eigen microphones. The production truck may also include an audio encoder, such as audio encoder 20 of FIG. 3.

The mobile device may also, in some instances, include a plurality of microphones that are collectively configured to record a 3D soundfield. In other words, the plurality of microphone may have X, Y, Z diversity. In some examples, the mobile device may include a microphone which may be rotated to provide X, Y, Z diversity with respect to one or more other microphones of the mobile device. The mobile device may also include an audio encoder, such as audio encoder 20 of FIG. 3.

A ruggedized video capture device may further be configured to record a 3D soundfield. In some examples, the ruggedized video capture device may be attached to a helmet of a user engaged in an activity. For instance, the ruggedized video capture device may be attached to a helmet of a user whitewater rafting. In this way, the ruggedized video capture device may capture a 3D soundfield that represents the action all around the user (e.g., water crashing behind the user, another rafter speaking in front of the user, etc. . . . ).

The techniques may also be performed with respect to an accessory enhanced mobile device, which may be configured to record a 3D soundfield. In some examples, the mobile device may be similar to the mobile devices discussed above, with the addition of one or more accessories. For instance, an Eigen microphone may be attached to the above noted mobile device to form an accessory enhanced mobile device. In this way, the accessory enhanced mobile device may capture a higher quality version of the 3D soundfield than just using sound capture components integral to the accessory enhanced mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a 3D soundfield. Moreover, in some examples, headphone playback devices may be coupled to a decoder 24 via either a wired or a wireless connection. In accordance with one or more techniques of this disclosure, a single generic representation of a soundfield may be utilized to render the soundfield on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a soundfield may be utilized to render the soundfield on any of the foregoing playback environments. Additionally, the techniques of this disclosure enable a renderer to render a soundfield from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the 3D soundfield of the sports game may be acquired (e.g., one or more Eigen microphones may be placed in and/or around the baseball stadium), HOA coefficients corresponding to the 3D soundfield may be obtained and transmitted to a decoder, the decoder may reconstruct the 3D soundfield based on the HOA coefficients and output the reconstructed 3D soundfield to a renderer, the renderer may obtain an indication as to the type of playback environment (e.g., headphones), and render the reconstructed 3D soundfield into signals that cause the headphones to output a representation of the 3D soundfield of the sports game.

In each of the various instances described above, it should be understood that the audio encoding device 20 may perform a method or otherwise comprise means to perform each step of the method for which the audio encoding device 20 is configured to perform In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio encoding device 20 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the audio decoding device 24 may perform a method or otherwise comprise means to perform each step of the method for which the audio decoding device 24 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio decoding device 24 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

The invention claimed is:

1. A method of editing audio data, the method comprising:
   manipulating spherical harmonics (SH) basis functions associated with higher order ambisonics coefficients to alter a direction of an audio object represented by the higher order ambisonics coefficients;

rendering, to a plurality of speaker feeds, the higher order ambisonic coefficients using the manipulated SH basis functions; and outputting the plurality of speaker feeds to drive one or more loudspeakers.

2. The method of claim 1, wherein the higher order ambisonic coefficients only represent the audio object.

3. The method of claim 1, wherein manipulating the SH basis functions associated with the higher order ambisonics coefficients comprises swapping two or more of the SH basis functions associated with the higher order ambisonics coefficients.

4. The method of claim 1, wherein manipulating the SH basis functions associated with the higher order ambisonics coefficients comprises multiplying the SH basis functions associated with the higher order ambisonics coefficients by a predetermined constant value.

5. The method of claim 4,
wherein outputting the plurality of speaker feeds comprises outputting the plurality of speaker feeds to drive the one or more loudspeakers such that a location from which the audio object appears to originate is 180 degrees to the right or the left of a location from which the audio object appears to originate using the SH basis functions prior to being manipulated.

6. The method of claim 1, wherein manipulating the SH basis functions associated with the higher order ambisonics coefficients comprises:
swapping two or more of the SH basis functions associated with the higher order ambisonics coefficients; and
multiplying the SH basis functions associated with the higher order ambisonics coefficients by a predetermined constant value.

7. The method of claim 6,
wherein outputting the plurality of speaker feeds comprises outputting the plurality of speaker feeds to drive the one or more loudspeakers such that a location from which the audio object appears to originate is 90 degrees to the right or the left of a location from which the audio object appears to originate using the SH basis functions prior to being manipulated.

8. The method of claim 6,
wherein outputting the plurality of speaker feeds comprises outputting the plurality of speaker feeds to drive the one or more loudspeakers such that a location from which the audio object appears to originate is 270 degrees to the right or the left of a location from which the audio object appears to originate using the SH basis functions prior to being manipulated.

9. The method of claim 1, wherein manipulating the SH basis functions comprises inverting the SH basis functions to project the audio object in space across a horizontal plane bisecting a sphere into two semi-spheres.

10. The method of claim 9, wherein outputting the plurality of speaker feeds comprises outputting the plurality of speaker feeds to drive the one or more loudspeakers such that a location from which the audio object appears to originate is an opposite one of the semi-spheres from which the audio object appears to originate using the SH basis functions prior to being manipulated.

11. A device configured to edit audio data, the device comprising:
a memory configured to store spherical harmonic (SH) basis functions; and
one or more processors configured to:
manipulate the SH basis functions associated with higher order ambisonics coefficients to alter a direction of an audio object represented by the higher order ambisonics coefficients;
render, to a plurality of speaker feeds, the higher order ambisonic coefficients using the manipulated SH basis functions; and
output the plurality of speaker feeds to drive one or more loudspeakers.

12. The device of claim 11, wherein the one or more processors are configured to swap two or more of the SH basis functions associated with the higher order ambisonics coefficients.

13. The device of claim 11, wherein the one or more processors are configured to multiply the SH basis functions associated with the higher order ambisonics coefficients by a predetermined constant value.

14. The device of claim 13, wherein the one or more processors are configured to output the plurality of speaker feeds to drive the one or more loudspeakers such that the location of the audio object appears to originate 198 degrees to the right or the left from which the audio object appears using the SH basis functions prior to being manipulated.

15. The device of claim 11, wherein the one or more processors are configured to swap two or more of the SH basis functions associated with the higher order ambisonics coefficients, and multiply the SH basis functions associated with the higher order ambisonics coefficients by a predetermined constant value.

16. The device of claim 15, wherein the one or more processors are configured to output the plurality of speaker feeds to drive the one or more loudspeakers such that the location of the audio object appears to originate 108 degrees to the right or the left from which the audio object appears using the SH basis functions prior to being manipulated.

17. The device of claim 15, wherein the one or more processors are configured to output the plurality of speaker feeds to drive the one or more loudspeakers such that the location of the audio object appears to originate 288 degrees to the right or the left from which the audio object appears using the SH basis functions prior to being manipulated.

18. The device of claim 11, wherein the one or more processors are configured to invert the SH basis functions to project the audio object in space across a horizontal plane bisecting a sphere into two semi-spheres.

19. The device of claim 18, wherein the one or more processors are configured to output the plurality of speaker feeds to drive the one or more loudspeakers such that the location of the audio object appears to originate from an opposite one of the semi-spheres at which the audio object appears using the SH basis functions prior to being manipulated.

20. A non-transitory computer-readable storage medium having stored thereon instructions that, when executed, cause one or more processors to:
store spherical harmonic (SH) basis functions;
manipulate the SH basis functions associated with higher order ambisonics coefficients to alter a direction of an audio object represented by the higher order ambisonics coefficients;
render, to a plurality of speaker feeds, the higher order ambisonic coefficients using the manipulated SH basis functions; and
output the plurality of speaker feeds to drive one or more loudspeakers.

* * * * *